United States Patent
Hong et al.

(10) Patent No.: US 10,871,563 B2
(45) Date of Patent: Dec. 22, 2020

(54) ANTENNA, VEHICLE RADAR, AND VEHICLE EQUIPPED WITH SAME

(71) Applicants: LG ELECTRONICS INC., Seoul (KR); SEOUL NATIONAL UNIVERSITY R&DB FOUNDATION, Seoul (KR)

(72) Inventors: Pyonho Hong, Seoul (KR); Byeongrim Jo, Seoul (KR); Juhnho Park, Seoul (KR); Doohee Lee, Seoul (KR); Jongseop Koo, Seoul (KR); Sangwook Nam, Seoul (KR)

(73) Assignees: LG ELECTRONICS INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 270 days.

(21) Appl. No.: 15/747,363

(22) PCT Filed: Jul. 22, 2016

(86) PCT No.: PCT/KR2016/008004
§ 371 (c)(1),
(2) Date: Jan. 24, 2018

(87) PCT Pub. No.: WO2017/018730
PCT Pub. Date: Feb. 2, 2017

(65) Prior Publication Data
US 2018/0217254 A1 Aug. 2, 2018

(30) Foreign Application Priority Data

Jul. 24, 2015 (KR) .................. 10-2015-0105321

(51) Int. Cl.
*G01S 13/931* (2020.01)
*H01Q 1/32* (2006.01)
(Continued)

(52) U.S. Cl.
CPC .............. *G01S 13/931* (2013.01); *G01S 7/03* (2013.01); *G01S 13/867* (2013.01); *H01Q 1/32* (2013.01);
(Continued)

(58) Field of Classification Search
CPC ........ G01S 13/931; G01S 7/03; G01S 13/867; G01S 2013/936; G01S 2013/9382;
(Continued)

(56) References Cited

U.S. PATENT DOCUMENTS 5,706,355 A * 1/1998 Raboisson ........... G05D 1/0242
345/589
6,052,086 A * 4/2000 Kudoh ................. H01Q 21/065
343/700 MS
(Continued)

FOREIGN PATENT DOCUMENTS

JP 2014-89691 A 5/2014
KR 10-2001-0046037 A 6/2001
(Continued)

*Primary Examiner* — Frank J McGue
(74) *Attorney, Agent, or Firm* — Birch, Stewart, Kolasch & Birch, LLP

(57) ABSTRACT

The present invention relates to an antenna, a vehicle radar, and a vehicle equipped with the same. An antenna according to an embodiment of the present invention comprises: a substrate; a first conductive patch disposed on a first surface of the substrate; a second conductive patch disposed on a second surface of the substrate; first and second feeders electrically connected to the first conductive patch; a plurality of vias surrounding the periphery of the first and second conductive patches; a loop member disposed on the first surface of the substrate and surrounding the vias; and a third feeder electrically connected to the loop member, wherein the area of the first conductive patch and the area of the second conductive patch are the same. Thus, it is
(Continued)

possible to stably transmit and receive radio waves in all directions.

18 Claims, 28 Drawing Sheets

(51) Int. Cl.
*H01Q 1/38* (2006.01)
*H01Q 9/04* (2006.01)
*G01S 7/03* (2006.01)
*G01S 13/86* (2006.01)

(52) U.S. Cl.
CPC ................ *H01Q 1/38* (2013.01); *H01Q 9/04* (2013.01); *H01Q 9/0407* (2013.01); *G01S 2013/9316* (2020.01); *G01S 2013/93273* (2020.01)

(58) Field of Classification Search
CPC .......... H01Q 9/04; H01Q 9/0407; H01Q 1/38; H01Q 1/32; H01Q 1/3233; H01Q 21/24; H01Q 1/3208; H01Q 1/3275; H01Q 7/00
USPC .......................................... 342/55
See application file for complete search history.

(56) References Cited

U.S. PATENT DOCUMENTS

| 6,281,854 B1* | 8/2001 | Ohoka ................... H01Q 1/273 343/718 |
| 2009/0128446 A1* | 5/2009 | Gummalla ............... H01Q 1/38 343/911 R |
| 2010/0073254 A1* | 3/2010 | Lee ........................ H01Q 5/364 343/860 |
| 2014/0320609 A1* | 10/2014 | Stettner ................. G01S 17/023 348/47 |
| 2015/0211896 A1* | 7/2015 | Wang ....................... G01V 3/00 324/682 |
| 2016/0301125 A1* | 10/2016 | Kim ....................... H01Q 1/243 |
| 2018/0114042 A1* | 4/2018 | Tenno ................. G06K 7/10356 |
| 2018/0131095 A1* | 5/2018 | Yang ...................... H01Q 1/526 |
| 2018/0284700 A1* | 10/2018 | Nakajima ............ H01Q 9/0428 |

FOREIGN PATENT DOCUMENTS

| KR | 10-2011-0035577 A | 4/2011 |
| KR | 10-2013-0006601 A | 1/2013 |
| KR | 10-1449841 B1 | 10/2014 |

* cited by examiner

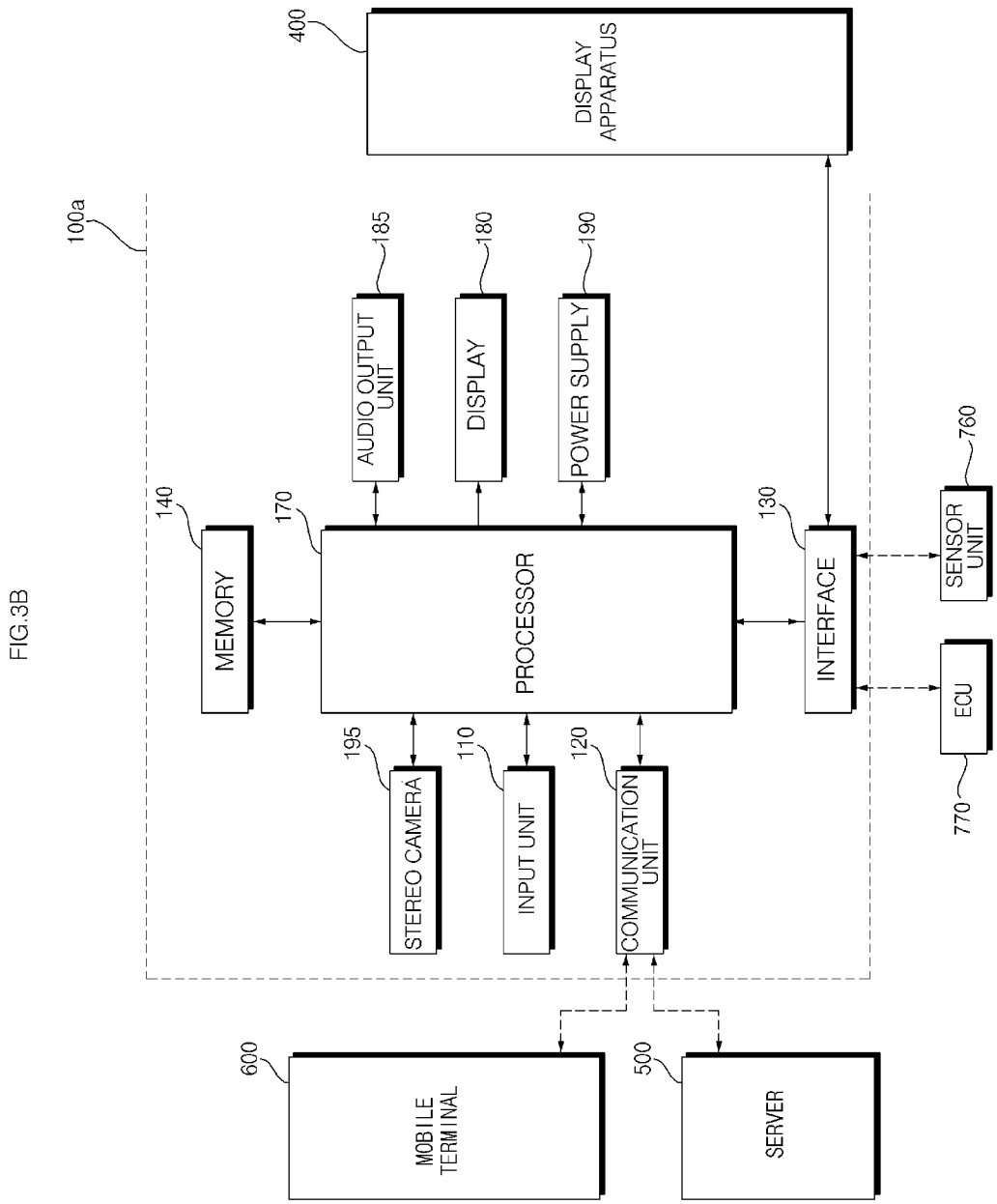

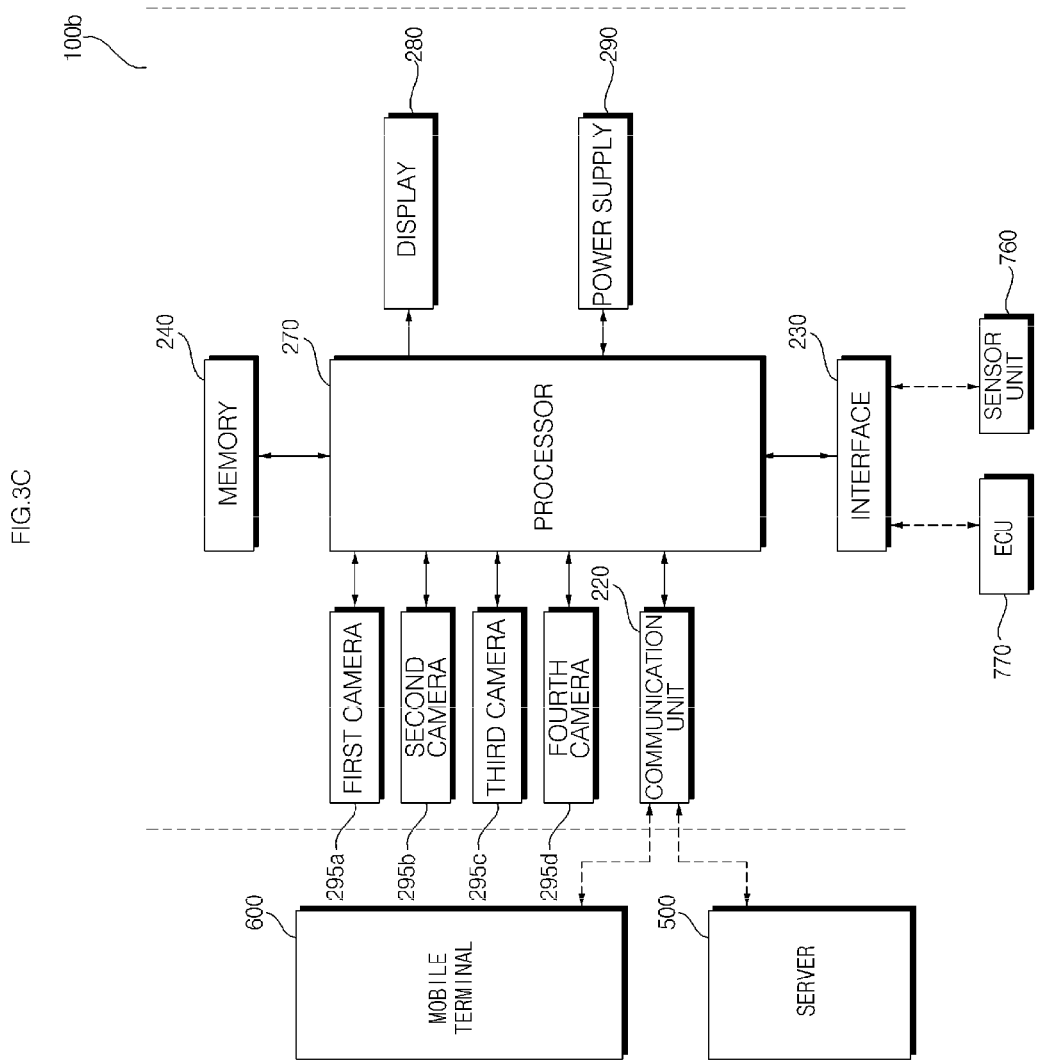

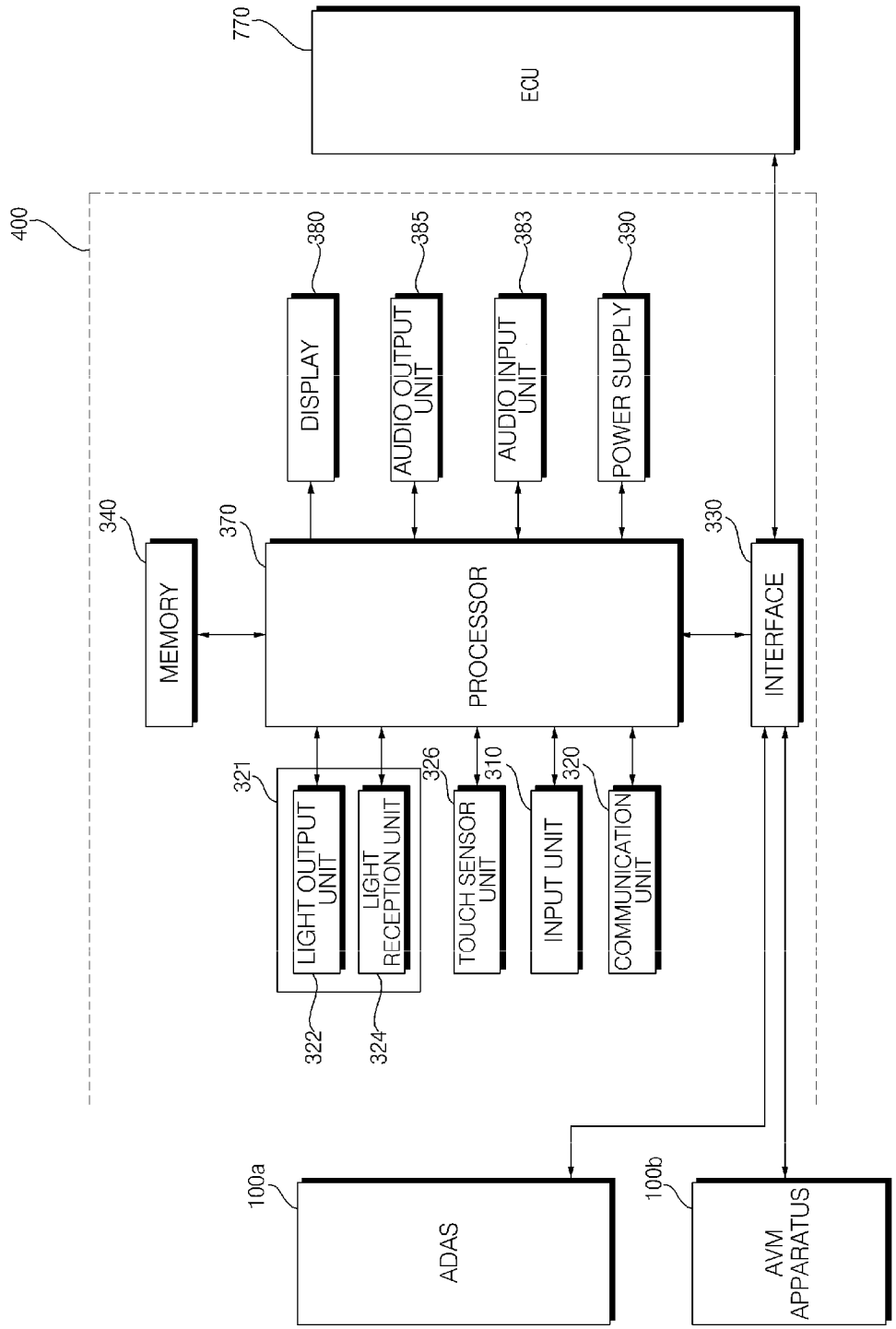

ANTENNA, VEHICLE RADAR, AND VEHICLE EQUIPPED WITH SAME

CROSS REFERENCE TO RELATED APPLICATIONS

This application is the National Phase of PCT International Application No. PCT/KR2016/008004, filed on Jul. 22, 2016, which claims priority under 35 U.S.C. 119(a) to Patent Application No. 10-2015-0105321, filed in the Republic of Korea on Jul. 24, 2015, all of which are hereby expressly incorporated by reference into the present application.

TECHNICAL FIELD

The present invention relates to an antenna, a vehicle radar and a vehicle including the same and, more particularly, to an antenna capable of stably transmitting and receiving waves in all directions, a vehicle radar and a vehicle including the same.

BACKGROUND ART

A vehicle is an apparatus that allows a user who rides therein to drive the vehicle in a desired direction. A representative example of the vehicle may be an automobile.

For vehicle communication or transmission and reception of signals for detecting an object located near a vehicle, antennas tend to be used.

In particular, research into antennas for implementing dedicated short-range communication (DSRC) multiple-input multiple-output (MIMO) has been continuously conducted.

DISCLOSURE

Technical Problem

An object of the present invention devised to solve the problem lies in an antenna capable of stably transmitting and receiving waves in all directions, a vehicle radar and a vehicle including the same.

Technical Solution

The object of the present invention can be achieved by providing an antenna including a substrate, a first conductive patch disposed on a first surface of the substrate, a second conductive patch disposed on a second surface of the substrate, first and second feeders electrically connected to the first conductive patch, a plurality of vias surrounding peripheries of the first and second conductive patches, a loop member disposed on the first surface of the substrate and surrounding the vias, and a third feeder electrically connected to the loop member, wherein an area of the first conductive patch is equal to that of the second conductive patch.

Another object of the present invention, there is provided a vehicle radar including an antenna, an antenna drive unit for driving the antenna, a transmission unit for transmitting a transmission signal to the antenna, a reception unit for performing signal processing with respect to a reception signal received from the antenna, and a processor for calculating distance information or phase information of an object located near a vehicle based on the transmission signal and the reception signal, wherein the antenna includes a substrate, a first conductive patch disposed on a first surface of the substrate, a second conductive patch disposed on a second surface of the substrate, first and second feeders electrically connected to the first conductive patch, a plurality of vias surrounding peripheries of the first and second conductive patches, a loop member disposed on the first surface of the substrate and surrounding the vias, and a third feeder electrically connected to the loop member, and wherein an area of the first conductive patch is equal to that of the second conductive patch.

Another object of the present invention, there is provided a vehicle including a plurality of cameras, a radar, and a processor for performing control to autonomously drive the vehicle based on images from the plurality of cameras and distance information or phase information from the radar in an autonomous mode, wherein the radar comprises an antenna comprising a substrate, a first conductive patch disposed on a first surface of the substrate, a second conductive patch disposed on a second surface of the substrate, first and second feeders electrically connected to the first conductive patch, a plurality of vias surrounding peripheries of the first and second conductive patches, a loop member disposed on the first surface of the substrate and surrounding the vias, and a third feeder electrically connected to the loop member, and wherein an area of the first conductive patch is equal to that of the second conductive patch.

Advantageous Effects

An antenna, a vehicle radar and a vehicle including the same according to the embodiments of the present invention include a substrate, a first conductive patch disposed on a first surface of the substrate, a second conductive patch disposed on a second surface of the substrate, first and second feeders electrically connected to the first conductive patch, a plurality of vias surrounding peripheries of the first and second conductive patches, a loop member disposed on the first surface of the substrate and surrounding the vias, and a third feeder electrically connected to the loop member, wherein an area of the first conductive patch is equal to that of the second conductive patch. Therefore, it is possible to stably transmit and receive radio waves in all directions.

By setting the area of the first conductive patch to be equal to that of the second conductive patch, radiation of horizontally polarized waves in a horizontal plane increases, and complementary radiation patterns appear through the first and second feeders such that a constant radiation pattern appears in the horizontal plane.

The loop member is formed in the peripheries of the first and second conductive patches, such that a vertical radiation pattern of vertically polarized waves appears.

Meanwhile, the plurality of vias surrounding the peripheries of the first and second conductive patches are disposed between the peripheries of the first and second conductive patches and the loop member, such that the horizontally polarized waves and the vertically polarized waves are isolated from each other.

That is, the magnetic dipoles of the xz, yz and xy planes are formed by the electrical signals applied to the first, second and third feeders, thereby independently generating polarized waves. Therefore, it is possible to stably transmit and receive waves in all directions.

Meanwhile, according to the antenna of the embodiment of the present invention, it is possible to implement dedicated short-range communication (DSRC) multiple-input multiple-output (MIMO).

In particular, the antenna of the embodiment of the present invention may be used for vehicle-to-vehicle communication such as V2X.

DESCRIPTION OF DRAWINGS

FIG. 2b is a diagram showing the appearance of a stereo camera attached to the vehicle of FIG. 2a.

FIG. 2c is a schematic diagram showing the positions of a plurality of cameras attached to the vehicle of FIG. 2a.

FIGS. 3a to 3b are block diagrams showing various examples of the internal configuration of the autonomous driving apparatus of FIG. 1.

FIGS. 3c to 3d are block diagrams showing various examples of the internal configuration of the autonomous driving apparatus of FIG. 1.

FIG. 3e is a block diagram showing the internal configuration of a vehicle display apparatus of FIG. 1.

BEST MODEL

The present invention will now be described in detail with reference to the accompanying drawings.

The suffixes "module" and "unit" of elements herein are used for convenience of description and thus can be used interchangeably and do not have any distinguishable meanings or functions.

A vehicle as described in this specification may include an automobile and a motorcycle. Hereinafter, an automobile will be focused upon.

A vehicle as described in this specification may include all of a vehicle including an engine as a power source, a hybrid vehicle including both an engine and an electric motor as a power source, and an electric vehicle including an electric motor as a power source.

Figure 1:
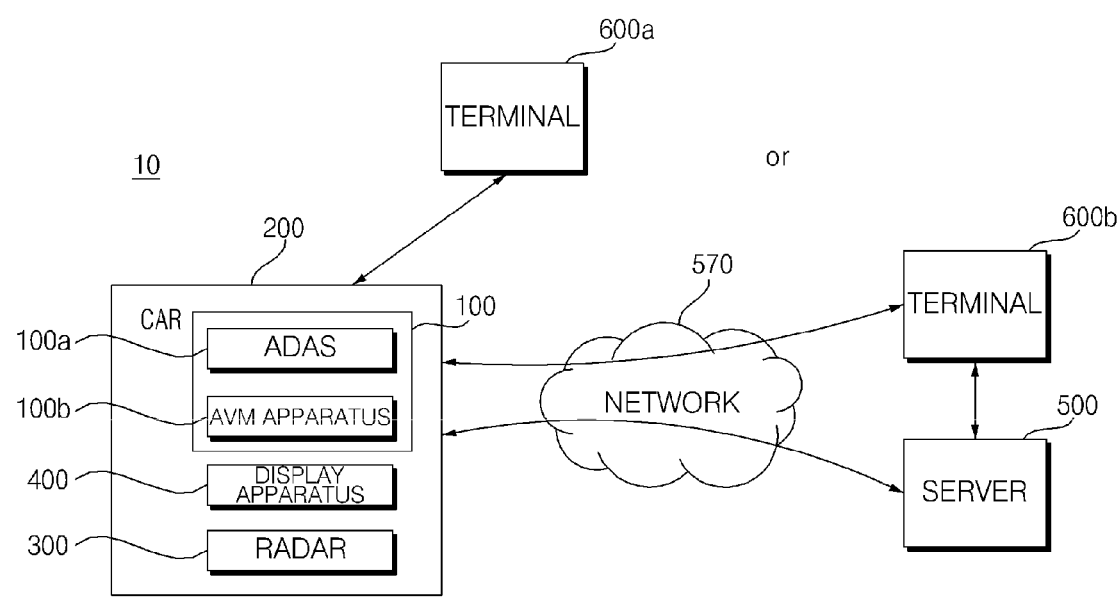
FIG. 1 is a diagram showing the concept of a vehicle communication system including an autonomous driving apparatus according to an embodiment of the present invention.

FIG. 1 is a diagram showing the concept of a vehicle communication system including an autonomous driving apparatus according to an embodiment of the present invention.

Referring to the figure, the vehicle communication system may include a vehicle 200, terminals 600a and 600b and a server 500.

The vehicle 200 may include an autonomous driving apparatus 100, a vehicle display apparatus 400, and a radar 300.

Meanwhile, the autonomous driving apparatus 100 may include an advanced driver assistance system (ADAS) 100a and an around view monitoring (AVM) apparatus 100b.

For example, when a vehicle autonomously travels, the vehicle may be autonomously driven through the ADAS 100a at a predetermined speed or more and may be autonomously driven through the around view monitoring apparatus 100b at less than the predetermined speed.

As another example, the ADAS 100a and the around view monitoring apparatus 100b simultaneously operate to autonomously drive the vehicle. However, when the vehicle travels at a predetermined speed or more, a weight may be given to the ADAS 100a to mainly perform autonomous driving of the vehicle using the ADAS 100a and, when the vehicle travels at less than the predetermined speed, a weight is given to the around view monitoring apparatus 100b to mainly perform autonomous driving of the vehicle using the around view monitoring apparatus 100b.

Meanwhile, the ADAS 100a, the around view monitoring apparatus 100b, and the vehicle display apparatus 400 may exchange data with the terminals 600a and 600b or the server 500 using a communication unit (not shown) provided therein or a communication unit provided in the vehicle 200.

For example, if the mobile terminal 600a is located inside or near the vehicle, at least one of the ADAS 100a, the around view monitoring apparatus 100b and the vehicle display apparatus 400 exchange data with the terminal 600a through short-range communication.

As another example, if the terminal 600b is far away from the vehicle, at least one of the ADAS 100a, the around view monitoring apparatus 100b and the vehicle display apparatus 400 may exchange data with the terminal 600b or the server 500 over a network 570 using long-distance communication (mobile communication, etc.).

The terminals 600a and 600b may be mobile terminals such as cellular phones, smartphones, tablet PCs or wearable devices such as smart watches or fixed terminals such as TVs or monitors. Hereinafter, a mobile terminal such as a smartphone will be focused upon as the terminal 600.

Meanwhile, the server 500 may be a sever provided by a vehicle manufacturer or a server managed by a provider for providing a vehicle related service. For example, the server may be a server managed by a provider for providing information on road and traffic conditions.

Meanwhile, the ADAS 100a may process a stereo image received from a stereo camera 195 based on computer vision and generate and provide vehicle related information. Here, the vehicle related information may include vehicle control information for directly controlling a vehicle or driver assistance information for guiding a driver.

Alternatively, the ADAS 100a may generate and provide a control signal for autonomously driving a vehicle based on the stereo image received from the stereo camera 195 and distance information of the object located near the vehicle, which is received from a radar 300. For example, the ADAS may output a control signal for controlling at least one of a steering drive unit, a brake drive unit or a power source drive unit upon autonomously driving the vehicle.

The around view monitoring apparatus 100b may deliver a plurality of images captured by a plurality of cameras 295a, 295b, 295c and 295d to the processor (270 of FIG. 3c or 3d) of the vehicle 200 and the processor (270 of FIG. 3c or 3d) may synthesize the plurality of images to generate and provide an around view image.

The vehicle display apparatus 400 may be an audio/video navigation (AVN) apparatus.

The vehicle display apparatus 400 may include a space recognition sensor unit and a touch sensor unit. Long-distance approach may be sensed through the space recognition sensor unit and short-distance touch approach may be sensed through the touch sensor unit. A user interface corresponding to sensed user gesture or touch may be provided.

The radar 300 may include an antenna (310 of FIG. 9) for transmitting and receiving signals to and from the outside.

The antenna (310 of FIG. 9) according to the embodiment of the present invention may include a substrate 900, a first conductive patch (upper patch) 910 disposed on a first surface of the substrate 900, a second conductive patch (lower patch) 920 disposed on a second surface of the substrate 900, first and second feeders 932 and 934 electrically connected to the first conductive patch 910, a plurality of vias 940 surrounding the peripheries of the first conductive patch 910 and the second conductive patch 920, a loop member 945 disposed on the first surface of the substrate 900 and surrounding the vias 940, and a third feeder 936 electrically connected to the loop member 945. The area of the first conductive patch 910 may be equal to that of the second conductive patch 920. Therefore, it is possible to stably transmit and receive waves in all directions.

By setting the area of the first conductive patch 910 to be equal to that of the second conductive patch 920, radiation of horizontally polarized waves in a horizontal plane increases, and complementary radiation patterns appear through the first and second feeders 932 and 934 such that a constant radiation pattern appears in the horizontal plane.

The loop member 945 is formed in the peripheries of the first and second conductive patches 910 and 920, such that a vertical radiation pattern of vertically polarized waves appears.

Meanwhile, the plurality of vias 940 surrounding the peripheries of the first and second conductive patches are disposed between the peripheries of the first and second conductive patches 910 and 920 and the loop member 945, such that the horizontally polarized waves and the vertically polarized waves are isolated from each other.

That is, the magnetic dipoles of the xz, yz and xy planes are formed by the electrical signals applied to the first, second and third feeders 932, 934 and 936, thereby independently generating polarized waves. Therefore, it is possible to stably transmit and receive waves in all directions.

Meanwhile, according to the antenna 310 of the embodiment of the present invention, it is possible to implement dedicated short-range communication (DSRC) multiple-input multiple-output (MIMO).

In particular, the antenna 310 of the embodiment of the present invention may be used for vehicle-to-vehicle communication such as V2X.

The antenna 310 of the embodiment of the present invention will be described in greater detail with reference to FIG. 8 and subsequent figures thereto.

Figure 2A:
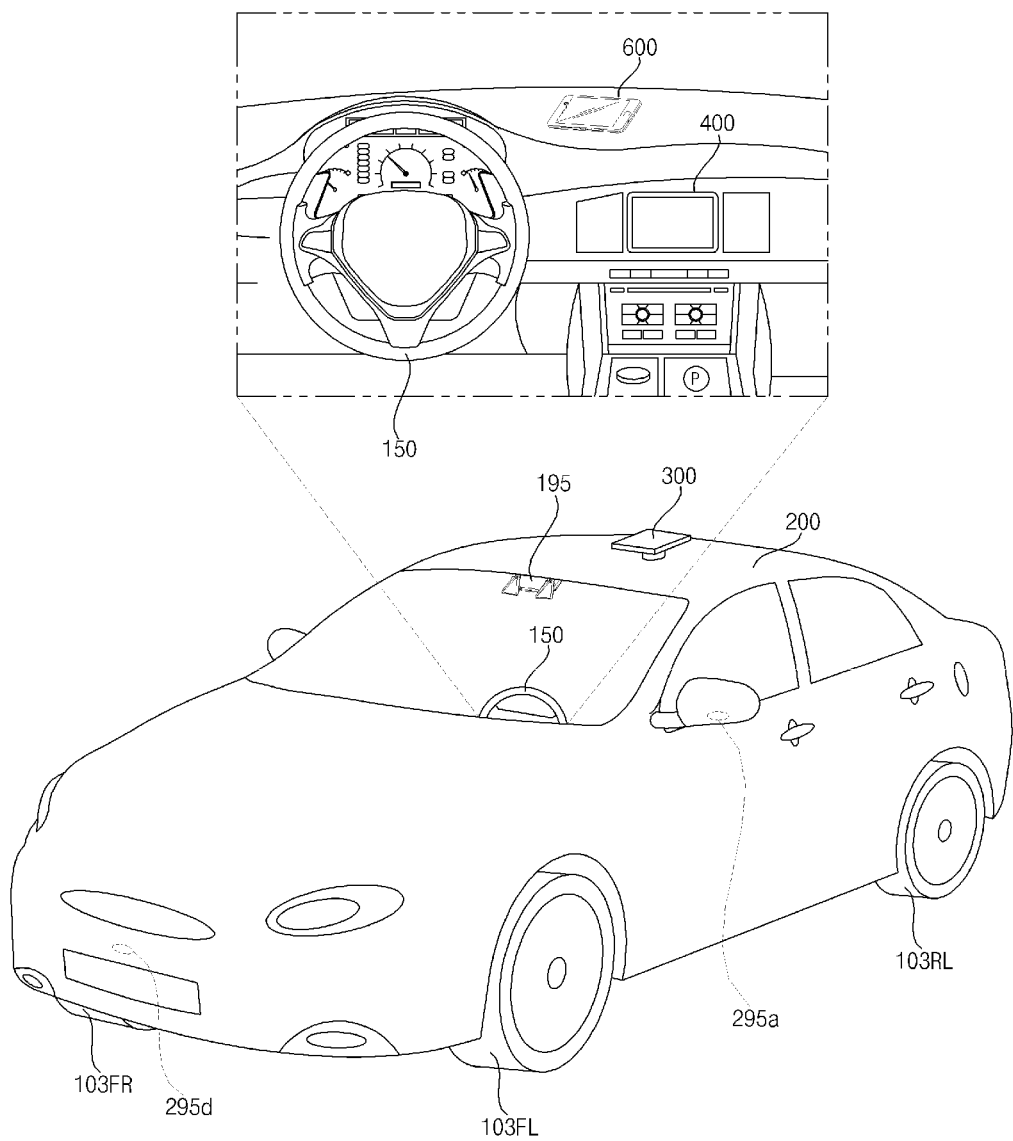
FIG. 2a is a diagram showing the appearance of a vehicle including various cameras.

FIG. 2a is a diagram showing the appearance of a vehicle including various cameras.

Referring to the figure, the vehicle 200 may include wheels 203FR, 103FL, 103RL, . . . rotated by a power source, a steering wheel 250 for controlling the direction of travel of the vehicle 200, the stereo camera 195 provided in the vehicle 200 for the ADAS 100a of FIG. 1, and a plurality of cameras 295a, 295b, 295c, 295d mounted in the vehicle 200 for the autonomous driving apparatus 100b of FIG. 1. In the figure, for convenience, only the left camera 295a and the front camera 295d are shown.

The stereo camera 195 may include a plurality of cameras and a stereo image acquired by the plurality of cameras may be processed by the ADAS (100a of FIG. 3).

In the figure, the stereo camera 195 includes two cameras.

The plurality of cameras 295a, 295b, 295c and 295d may be activated to acquire captured images when the speed of the vehicle is equal to or less than a predetermined speed or when the vehicle is reversed. The images acquired by the plurality of cameras may be processed by the around view monitoring apparatus (100b of FIG. 3c or 3d).

Figure 2B:
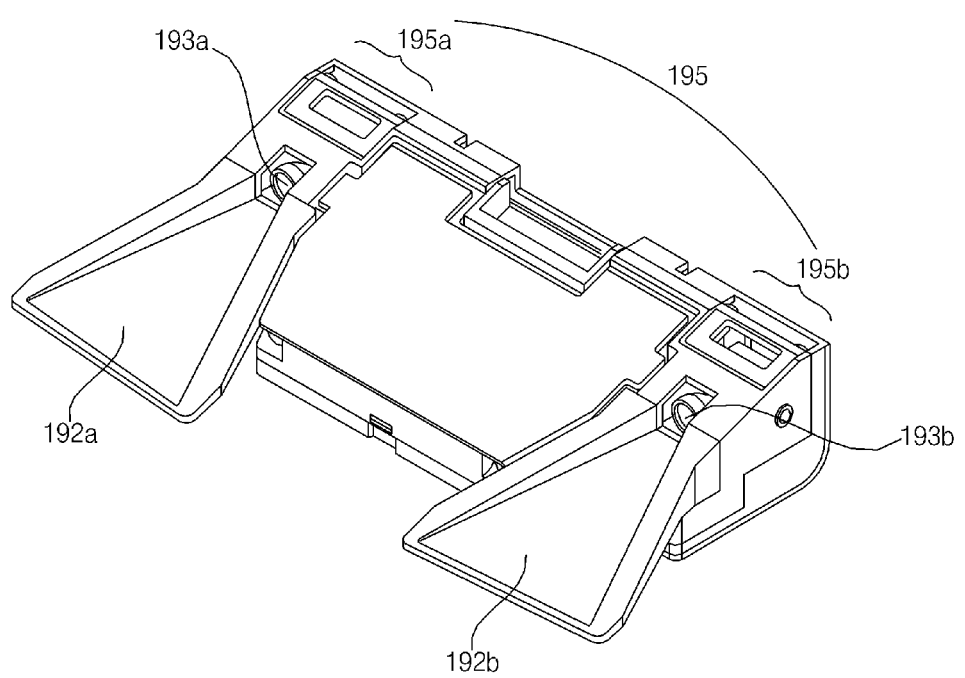

FIG. 2b is a diagram showing the appearance of a stereo camera attached to the vehicle of FIG. 2a.

Referring to the figure, a stereo camera module 195 may include a first camera 195a including a first lens 193a and a second camera 195b including a second lens 193b.

The stereo camera module 195 may include a first light shield unit 192a and a second light shield unit 192b for respectively shielding light incident upon the first lens 193a and the second lens 193b.

The stereo camera module 195 of the figure may be detachably provided on the ceiling or windshield of the vehicle 200.

The ADAS (100a of FIG. 3) including the stereo camera module 195 may acquire a stereo image of the front side of the vehicle from the stereo camera module 195, perform disparity detection based on the stereo image, detect an object from at least one stereo image based on disparity information, and continuously track motion of the object after object detection.

Figure 2C:
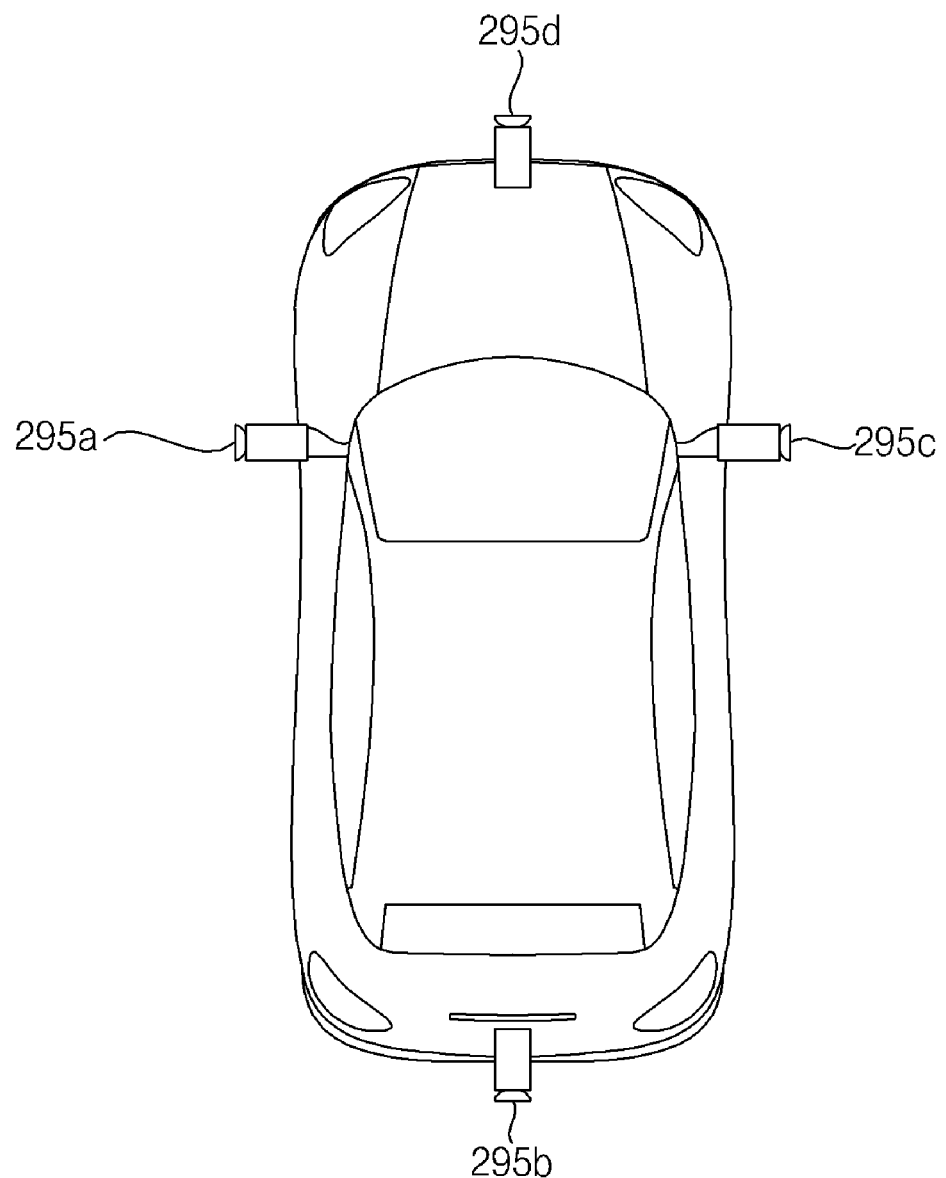
Figure 2D:
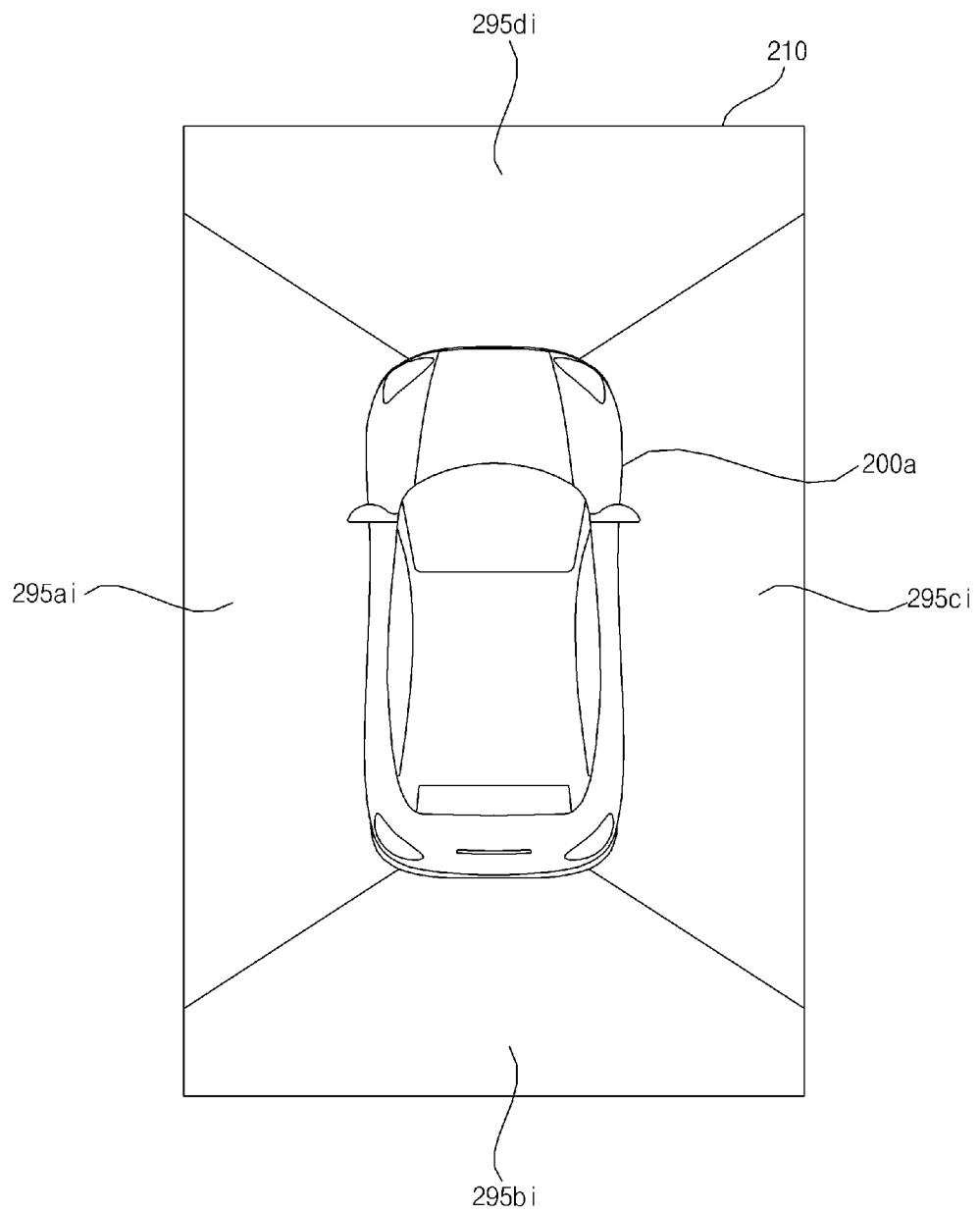
FIG. 2d is a diagram showing an around view image based on images captured by the plurality of cameras of FIG. 2c.

FIG. 2c is a schematic diagram showing the positions of a plurality of cameras attached to the vehicle of FIG. 2a, and FIG. 2d is a diagram showing an around view image based on images captured by the plurality of cameras of FIG. 2c.

First, referring to FIG. 2c, the plurality of cameras 295a, 295b, 295c and 295d may be disposed at the left, rear, right and front sides of the vehicle, respectively.

In particular, the left camera 295a and the right camera 295c may be disposed in a case surrounding a left side-view mirror and a case surrounding a right side-view mirror, respectively.

The rear camera 295b and the front camera 295d may be disposed near a trunk switch or on or near an emblem.

The plurality of images captured by the plurality of cameras 295a, 295b, 295c and 295d is delivered to a processor (270 of FIG. 3c or 3d) of the vehicle 200 and the processor (270 of FIG. 3c or 3d) synthesizes the plurality of images to generate an around view image.

FIG. 2d shows an example of the around view image 210. The around view image 210 may include a first image area 295ai of the left camera 295a, a second image area 295bi of the rear camera 295b, a third image area 295ci of the right camera 295c and a fourth image area 295di of the front camera 295d.

Figure 3A:
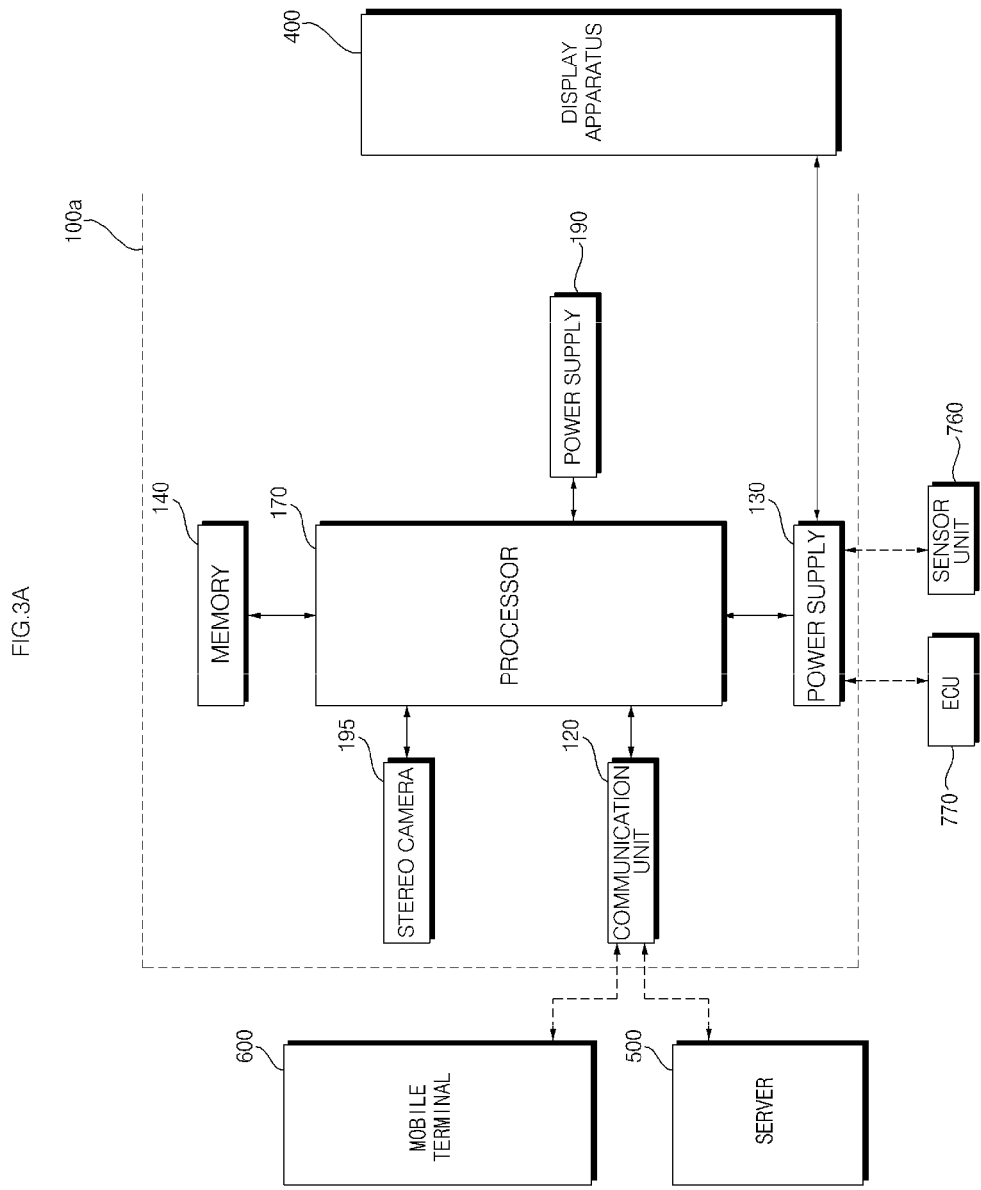

FIGS. 3a to 3b are block diagrams showing various examples of the internal configuration of the autonomous driving apparatus of FIG. 1.

FIGS. 3a to 3b are block diagrams showing the internal configuration of the ADAS 100a of the autonomous driving apparatus 100.

The ADAS 100a may process the stereo image received from the stereo camera 195 based on computer vision and generate vehicle related information. Here, the vehicle related information may include vehicle control information for directly controlling a vehicle or driver assistance information for guiding a driver.

First, referring to FIG. 3a, the ADAS 100a of FIG. 3a may include a communication unit 120, an interface 130, a memory 130, a processor 170, a power supply 190 and the stereo camera 195.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as Bluetooth, Wi-Fi Direct, Wi-Fi or APiX.

The communication unit 120 may receive weather information and road traffic situation information, e.g., Transport Protocol Experts Group (TPEG) information, from the mobile terminal 600 or the server 500. The ADAS 100a may transmit real-time traffic information obtained based on the stereo images to the mobile terminal 600 or the server 500.

When a user gets into the vehicle, the mobile terminal 600 of the user and the ADAS 100a may pair with each other automatically or as the user executes an application.

The interface 130 may receive vehicle related data or transmit signals processed or generated in the processor 170 to an external device. The interface 130 may perform data communication with an ECU 770, an audio/video navigation (AVN) apparatus 400 and a sensor unit 760 using a wired or wireless communication method.

The interface 130 may receive map information related to vehicle driving through data communication with the vehicle display apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Such sensor information may be acquired by a heading sensor, a yaw sensor, a gyro sensor, a position module, a vehicle forward/reverse sensor, a wheel sensor, a vehicle speed sensor, a gradient sensor, a battery sensor, a fuel sensor, a tire sensor, a steering sensor based on rotation of the steering wheel, a vehicle interior temperature sensor, a vehicle interior humidity sensor, etc. The position module may include a GPS module for receiving GPS information.

Information related to vehicle driving, such as vehicle direction information, vehicle position information, vehicle angle information, vehicle speed information and vehicle tilt information, may be referred to as vehicle driving information.

The memory 140 may store a variety of data for overall operation of the ADAS 100a, such as a program for processing or control of the processor 170.

An audio output unit (not shown) converts an electrical signal from the processor 170 into an audio signal and outputs the audio signal. The audio output unit may include a speaker. The audio output unit (not shown) may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the ADAS 100a.

In particular, the processor 170 performs signal processing based on computer vision. Therefore, the processor 170 may acquire a stereo image of the front side of the vehicle from the stereo camera module 195, perform disparity calculation of the front side of the vehicle based on the stereo image, detect an object from at least one stereo image based on disparity information, and continuously track motion of the object after object detection.

In particular, the processor 170 may perform lane detection, peripheral vehicle detection, pedestrian detection, traffic sign detection, road surface detection, etc. upon object detection.

The processor 170 may perform calculation of a distance from a detected peripheral vehicle, calculation of the speed of the detected peripheral vehicle, and calculation of a difference with the speed of the detected peripheral vehicle.

The processor 170 may receive weather information and road traffic situation information, e.g., Transport Protocol Experts Group (TPEG) information, through the communication unit 120.

The processor 170 may check the traffic situation information in the vicinity of the vehicle based on the stereo image in the ADAS 100a.

The processor 170 may receive map information from the vehicle display apparatus 400 through the interface 130.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

The power supply 190 may supply power required to operate the respective components under control of the processor 170. In particular, the power supply 190 may receive power from, for example, a battery (not illustrated) inside the vehicle.

The stereo camera 195 may include a plurality of cameras. Hereinafter, assume that the stereo camera 195 includes two cameras as described with reference to FIG. 2b.

The stereo camera 195 may be detachably provided on the ceiling or windshield of the vehicle 200 and may include a first camera 195a including a first lens 193a and a second camera 195b including a second lens 193b.

The stereo camera module 195 may include a first light shield unit 192a and a second light shield unit 192b for respectively shielding light incident upon the first lens 193a and the second lens 193b.

Next, referring to FIG. 3b, the ADAS 100a of FIG. 3b may further include an input unit 110, a display 180 and an audio output unit 185, as compared to the ADAS 100a of FIG. 3a. Hereinafter, only the input unit 110, the display 180 and the audio output unit 185 will be described.

The input unit 110 may include a plurality of buttons attached to the ADAS 100a and, more particularly, to the stereo camera 195 or a touchscreen. The ADAS 100a may be powered on through the plurality of buttons or the touchscreen. Various other input operations may be performed.

The display 180 may display an image related to operation of the ADAS. In order to display the image, the display 180 may include a cluster or a head up display (HUD) located at the internal front side of the vehicle. When the display 180 is a HUD, a projection module for projecting an image on the windshield of the vehicle 200 may be included.

The audio output unit 185 may output sound based on the audio signal processed by the processor 170. The audio output unit 185 may include at least one speaker.

Figure 3D:
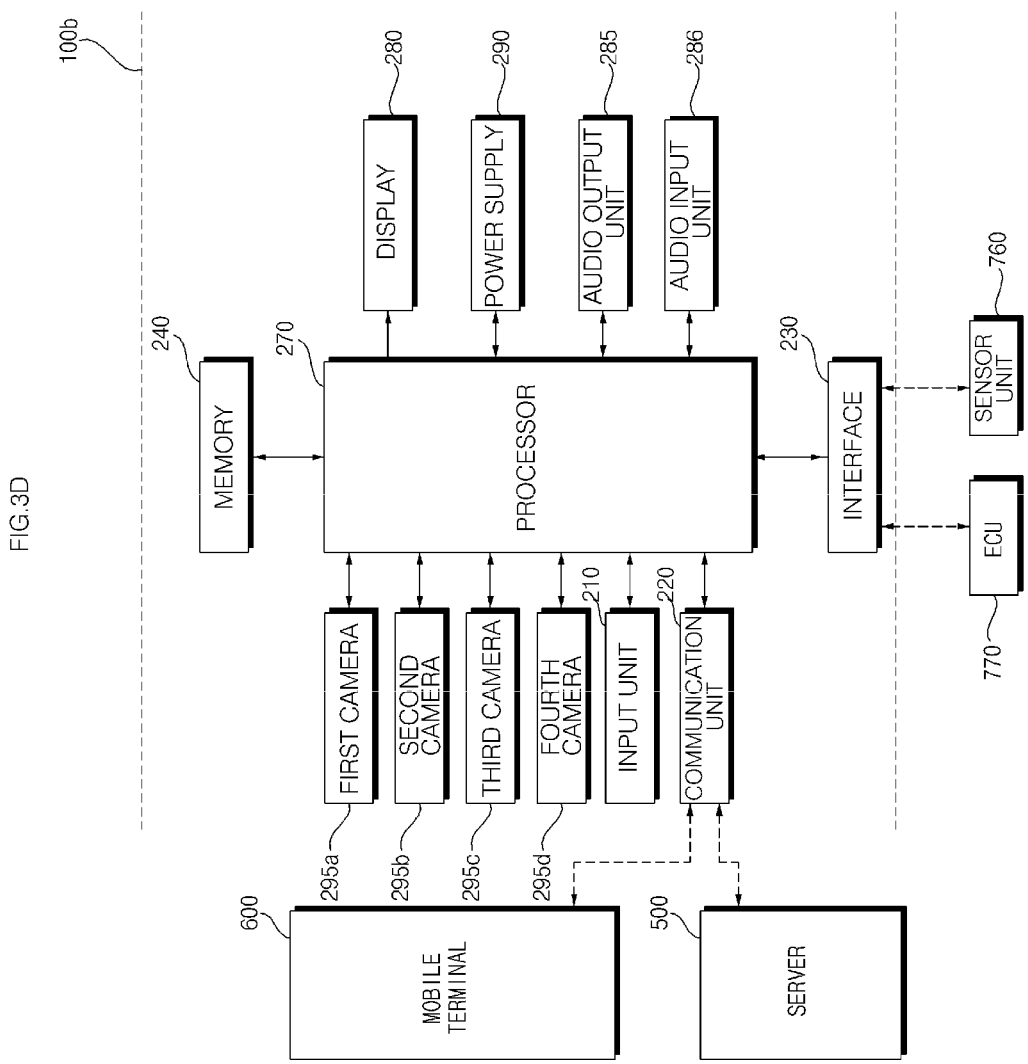

FIGS. 3c to 3d are block diagrams showing various examples of the internal configuration of the autonomous driving apparatus of FIG. 1.

FIGS. 3c to 3d are block diagrams showing the internal configuration of the around view monitoring apparatus 100b of the autonomous driving apparatus 100.

The around view monitoring apparatus 100b of FIGS. 3c to 3d may synthesize a plurality of images received from the plurality of cameras 295a, . . . , 295d to generate an around view image.

The around view monitoring apparatus 100b may detect, verify and track an object located near the vehicle based on the plurality of images received from the plurality of cameras 295a, . . . , 295d.

First, referring to FIG. 3c, the around view monitoring apparatus 100b of FIG. 3c may include a communication unit 220, an interface 230, a memory 240, a processor 270, a display 280, a power supply 290 and a plurality of cameras 295a, . . . , 295d.

The communication unit 220 may exchange data with a mobile terminal 600 or a server 500 in a wireless manner. In particular, the communication unit 220 may exchange data with the mobile terminal of the driver in a wireless manner. The wireless communication method may include various data communication methods such as Bluetooth, Wi-Fi Direct, Wi-Fi or APiX.

The communication unit 220 may receive a schedule of a driver, schedule information related to a movement position, weather information and road traffic situation information, e.g., Transport Protocol Experts Group (TPEG) information, from the mobile terminal 600 or the server 500. The around view monitoring apparatus 100b may transmit real-time traffic information obtained based on the images to the mobile terminal 600 or the server 500.

When a user gets into the vehicle 100, the mobile terminal 600 of the user and the around view monitoring apparatus 100b may pair with each other automatically or as the user executes an application.

The interface 230 may receive vehicle related data or transmit signals processed or generated in the processor 270 to an external device. The interface 230 may perform data communication with an ECU 770 or a sensor unit 760 using a wired or wireless communication method.

The interface 230 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Information related to vehicle driving, such as vehicle direction information, vehicle position information, vehicle angle information, vehicle speed information and vehicle tilt information, may be referred to as vehicle driving information.

The memory 240 may store a variety of data for overall operation of the around view monitoring apparatus 100b, such as a program for processing or control of the processor 270.

The memory 240 may store map information related to vehicle driving.

The processor 270 controls overall operation of the units of the around view monitoring apparatus 100b.

In particular, the processor 270 may acquire the plurality of images from the plurality of cameras 295a, . . . , 295d, and synthesize the plurality of images to generate the around view image.

In particular, the processor 270 performs signal processing based on computer vision. For example, the processor may perform disparity calculation of the vicinity of the vehicle based on the plurality of images or the generated around view image, perform object detection within the image based on the calculated disparity information, and continuously track motion of an object after object detection.

In particular, the processor 270 may perform lane detection, peripheral vehicle detection, pedestrian detection, obstacle detection, parking area detection and road surface detection, etc. upon object detection.

The processor 270 may calculate a distance from a detected peripheral vehicle or pedestrian.

The processor 270 may receive sensor information from the ECU 770 or the sensor unit 760 through the interface 230. The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

The display 280 may display the around view image generated by the processor 270. Upon displaying the around view image, various user interfaces may be provided and a touch sensor for enabling touch input through the provided user interface may be included.

The display 280 may include a cluster or a head up display (HUD) located at the internal front side of the vehicle. When the display 280 is a HUD, a projection module for projecting an image on the windshield of the vehicle 200 may be included.

The power supply 290 may supply power required to operate the respective components under control of the processor 270. In particular, the power supply 290 may receive power from, for example, a battery (not illustrated) inside the vehicle.

The plurality of cameras 295a, 295b, 295c and 295d may be wide angle cameras in order to provide the around view image.

Next, referring to FIG. 3d, the around view monitoring apparatus 100b of FIG. 3d is similar to the around view monitoring apparatus 100b of FIG. 3c but is different therefrom in that an input unit 210, an audio output unit 285, and an audio input unit 286 are further included. Hereinafter, only the input unit 210, the audio output unit 285 and the audio input unit 286 will be described.

The input unit 210 may include a plurality of buttons around the display 280 or a touchscreen provided on the display 280. The around view monitoring apparatus 100b may be powered on through the plurality of buttons or the touchscreen. Various other input operations may be performed.

The audio output unit 285 may output convert the electrical signal from the processor 270 into an audio signal and output the audio signal. The audio output unit may include at least one speaker. The audio output unit 285 may output sound corresponding to operation of the input unit 210, that is, the button.

The audio input unit 286 may receive user voice. To this end, the audio input unit may include a microphone. The received voice may be converted into an electrical signal and delivered to the processor 270.

The around view monitoring apparatus 100b of FIG. 3c or 3d may be an audio/video navigation (AVN) apparatus.

FIG. 3e is a block diagram showing the internal configuration of the vehicle display apparatus of FIG. 1.

Referring to the figure, the vehicle display apparatus 400 according to the embodiment of the present invention may include an input unit 310, a communication unit 320, a space sensor 321, a touch sensor 326, an interface 330, a memory 340, a processor 370, a display 380, an audio input unit 383, an audio output unit 385 and a power supply 390.

The input unit 310 includes a button attached to the display apparatus 400, for example, a power button. In addition, the input unit may further include at least one of a menu button, up and down buttons and left and right buttons.

The input signal received by the input unit 310 may be sent to the processor 370.

The communication unit 320 may exchange data with an adjacent electronic apparatus, for example, an in-vehicle electronic apparatus or a server (not shown) wirelessly. In particular, the communication unit may exchange data with a mobile terminal of a driver wirelessly. A wireless data communication method may include various data communication methods such as Bluetooth, Wi-Fi, APiX, etc.

For example, when a user gets into the vehicle, the mobile terminal of the user and the display apparatus 400 may pair with each other automatically or as the user executes an application.

The communication unit 320 may include a GPS reception apparatus and may receive GPS information, that is, vehicle position information, via the GPS reception apparatus.

The space sensor 321 may sense approaching or movement of a user's hand. The space sensor may be provided in the vicinity of the display 480.

The space sensor 321 may perform space recognition based on light or ultrasonic waves. Hereinafter, space recognition based on light will be focused upon.

The space sensor 321 may sense approaching or movement of the user's hand based on output of light and reception of received light corresponding thereto. In particular, the processor 370 may perform signal processing with respect to an electrical signal of the output light and the received light.

The space sensor 321 may include a light output unit 322 and a light reception unit 324.

The light output unit 122 may output infrared (IR) light in order to sense the user's hand positioned in front of the display apparatus 400.

When light output from the light output unit 322 is diffused at or reflected from the user's hand located in front of the display apparatus 400, the light reception unit 324 receives diffused or reflected light. Specifically, the light reception unit 324 may include a photodiode to convert the received light into an electrical signal via the photodiode. The converted electrical signal may be input to the processor 370.

The touch sensor 326 senses floating touch and direct touch. The touch sensor 326 may include an electrode array, an MCU, etc. If the touch sensor operates, the electrical signal is supplied to the electrode array and an electric field is formed on the electrode array.

The touch sensor 326 may operate when the intensity of light received by the space sensor 321 is equal to or greater than a first level.

That is, when the user's hand approaches the display apparatus within a predetermined distance, the electrical signal may be supplied to the electrode array of the touch sensor 326. By the electrical signal supplied to the electrode array, an electric field is formed on the electrode array and capacitance change is sensed using such electric field. Based on the sensed capacitance change, floating touch and direct touch are sensed.

In particular, through the touch sensor 326, z-axis information as well as x-axis information and y-axis information may be sensed according to approaching of the user's hand.

The interface 330 may exchange data with another electronic apparatus installed in the vehicle. For example, the interface 330 may perform data communication with an electronic control unit (ECU) of the vehicle by a wired communication method.

Specifically, the interface 330 may receive vehicle state information through data communication with the ECU of the vehicle.

Here, the vehicle state information may include at least one of battery information, fuel information, vehicle speed information, tire information, steering information based on rotation of the steering wheel, vehicle lamp information, vehicle interior temperature information, vehicle exterior temperature information and vehicle interior humidity information.

The interface 330 may further receive GPS information from the ECU of the vehicle. Alternatively, the interface may transmit GPS information received from the display apparatus 400 to the ECU.

The memory 340 may store a variety of data for operation of the display apparatus 400, such as programs for processing or control of the processor 370.

For example, the memory 340 may store a map for guiding a driving route of the vehicle.

As another example, the memory 340 may store user information and mobile terminal information of the user, for pairing with the mobile terminal of the user.

The audio output unit 385 may convert the electrical signal from the processor 370 into an audio signal and output the audio signal. The audio output unit may include a speaker. The audio output unit 385 may output sound corresponding to operation of the input unit 310, that is, the button.

The audio input unit 383 may receive user voice. The audio input unit may include a microphone. The received voice may be converted into an electrical signal and sent to the processor 370.

The processor 370 may control operation of each unit of the vehicle display apparatus 400.

When a user's hand continuously approaches the display apparatus 400, the processor 370 may continuously calculate x-, y- and z-axis information of the user's hand based on light received by the light reception unit 324. At this time, the z-axis information may be sequentially reduced.

When the user's hand approaches the display 480 by a second distance closer than a first distance, the processor 370 may perform control to operate the touch sensor 326. That is, the processor 370 may perform control to operate the touch sensor 326 if the intensity of the electrical signal from the space sensor 321 is equal to or greater than a reference level. Therefore, the electrical signal is supplied to the electrode array in the touch sensor 325.

The procesor 370 may sense floating touch based on a sensing signal sensed by the touch sensor 326, when the user's hand is located within the second distance. In particular, the sensing signal may be a signal indicating capacitance change.

Based on such a sensing signal, the processor 370 may calculate x- and y-axis information of floating touch input and calculate z-axis information which is a distance between the display apparatus 400 and the user's hand, based on capacitance change.

The processor 370 may change grouping of the electrode array in the touch sensor 326 based on the distance to the user's hand.

Specifically, the processor 370 may change grouping of the electrode array in the touch sensor 326 based on approximate z-axis information calculated based on light received by the space sensor 321. As the distance increases, the size of an electrode array group may increase.

That is, the processor 370 may change the size of the touch sensing cell of the electrode array in the touch sensor 326 based on the distance information of the user's hand, that is, the z-axis information.

The display 480 may separately display an image corresponding to the function of a button. For image display, the display 480 may be implemented as various display modules such as an LCD or an OLED. The display 480 may be implemented as an in-vehicle cluster.

The power supply 390 may supply power necessary for operation of each component under control of the processor 370.

Figure 4A:
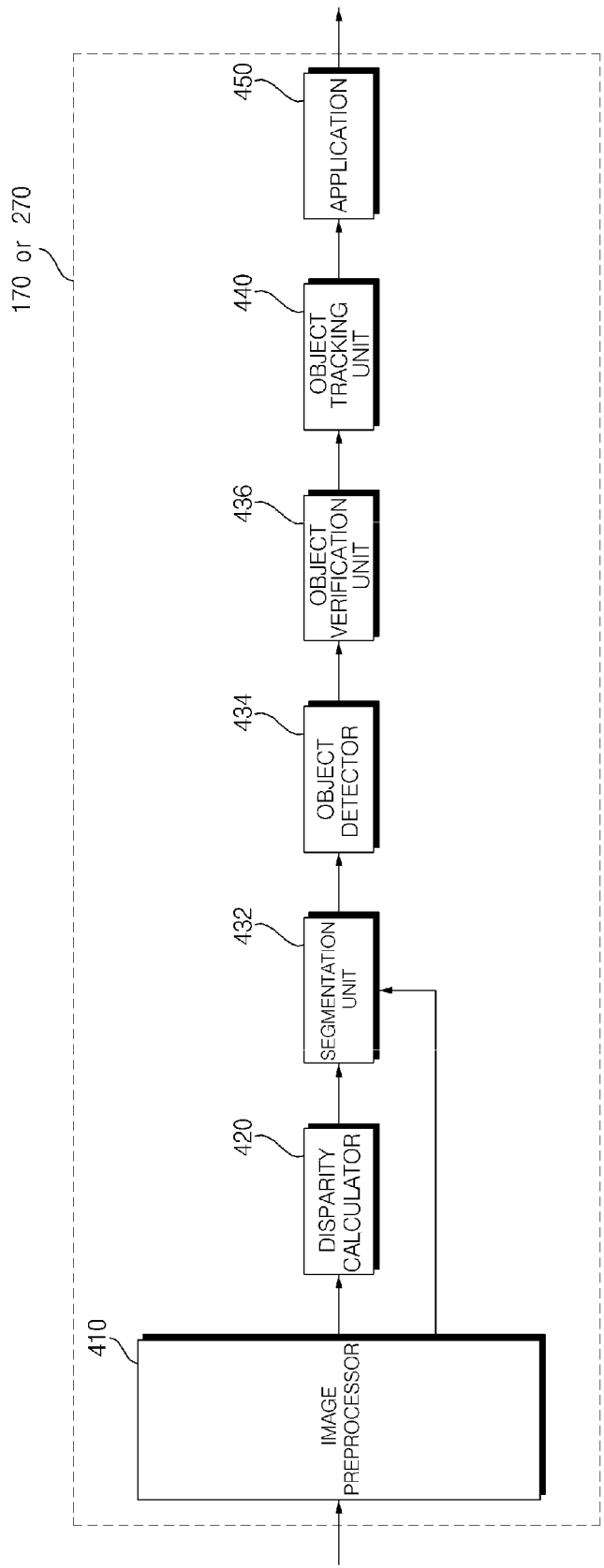
FIGS. 4a to 4b are block diagrams showing various examples of the internal configurations of the processors of FIGS. 3a to 3d.
Figure 4B:
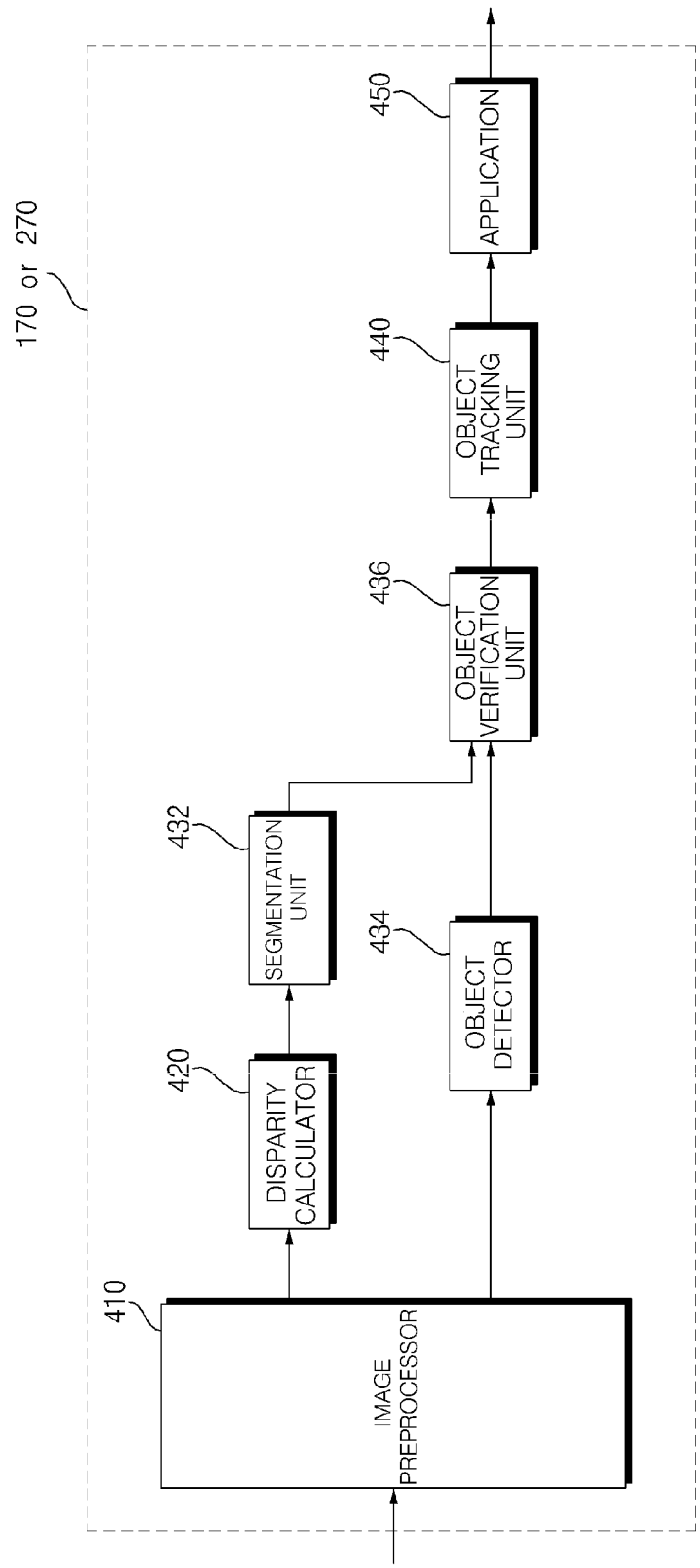

FIGS. 4a to 4b are block diagrams showing various examples of the internal configurations of the processors of FIGS. 3a to 3d, and FIG. 5 is a diagram showing object detection in the processors of FIGS. 4a to 4b.

First, referring to FIG. 4a, FIG. 4a is the block diagram showing the internal configuration of the processor 170 of the ADAS 100a of FIGS. 3a to 3b or the processor 270 of the around view monitoring apparatus 100b of FIGS. 3c to 3d.

The processor 170 or 270 may include an image preprocessor 410, a disparity calculator 420, an object detector 434, an object tracking unit 440 and an application 450.

The image preprocessor 410 receives the plurality of images from the plurality of cameras 295a, . . . , 295d or the generated around view image and performs preprocessing.

More specifically, the image preprocessor 410 may perform noise reduction, rectification, calibration, color enhancement, color space conversion (CSC), interpolation, camera gain control, etc. with respect to the plurality of images or the generated around view image. Therefore, it is possible to acquire images having higher definition than that of the images captured by the plurality of cameras 295a, . . . , 295d or the generated around view image.

The disparity calculator 420 receives the plurality of images or the generated around view image processed by the image preprocessor 410, performs stereo matching with respect to the plurality of images sequentially received during a predetermined time or the generated around view image, and acquires a disparity map according to stereo matching. That is, it is possible to acquire disparity information of the periphery of the vehicle.

At this time, stereo matching may be performed in pixel units of the stereo images or predetermined block units. The disparity map may mean a map numerically expressing the binocular parallax information of the images, that is, left and right images.

A segmentation unit 432 may perform segmentation and clustering with respect to the images based on the disparity information from the disparity calculator 420.

More specifically, the segmentation unit 432 may segment a background and a foreground with respect to at least one of the images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the images based on the disparity information.

More specifically, the object detector 434 may detect the object from at least one of the images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 240 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

FIG. 4b is a block diagram showing another example of the internal configuration of the processor.

Referring to the figure, the processor 170 or 270 of FIG. 4b is equal to the processor 170 or 270 of FIG. 4a except for a signal processing order. Hereinafter, only the difference will be described.

The object detector 434 may receive the plurality of images or the generated around view image and detect the object from the plurality of images or the generated around view image. Unlike FIG. 4a, the object may not be detected from the segmented image but may be directly detected from the plurality of images or the generated around view image based on the disparity information.

Next, the object verification unit 436 classifies and verifies the segmented and detected object based on the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

Figure 5A:
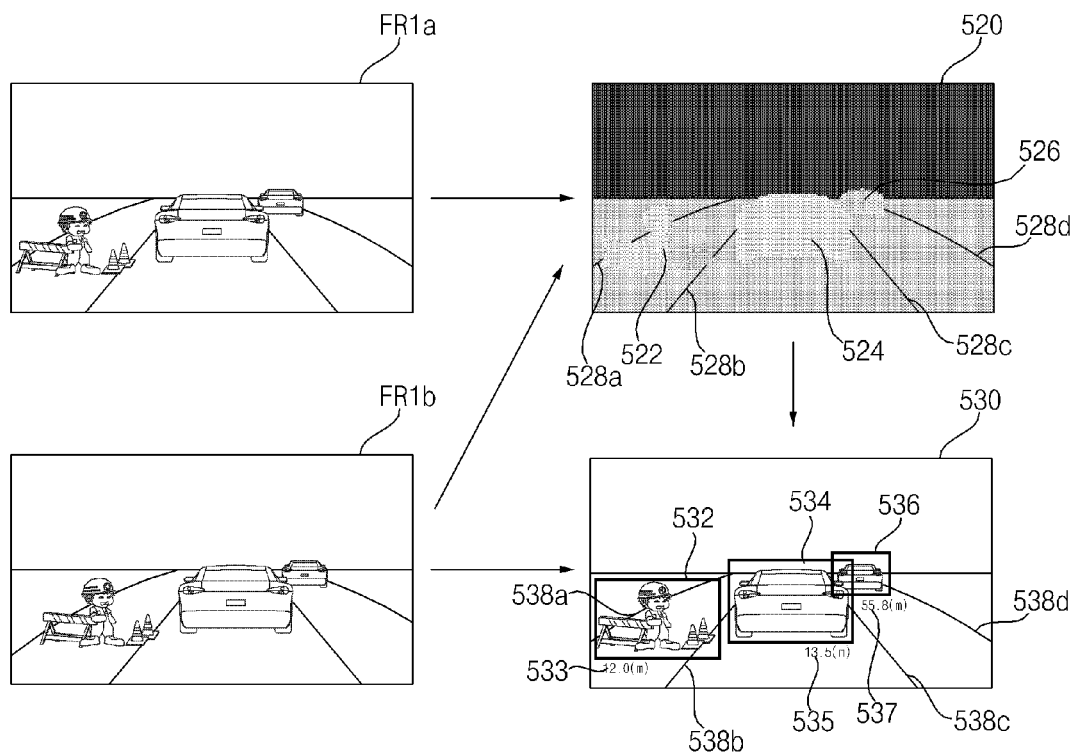
FIGS. 5a and 5b are diagrams showing object detection in the processors of FIGS. 4a to 4b.
Figure 5B:
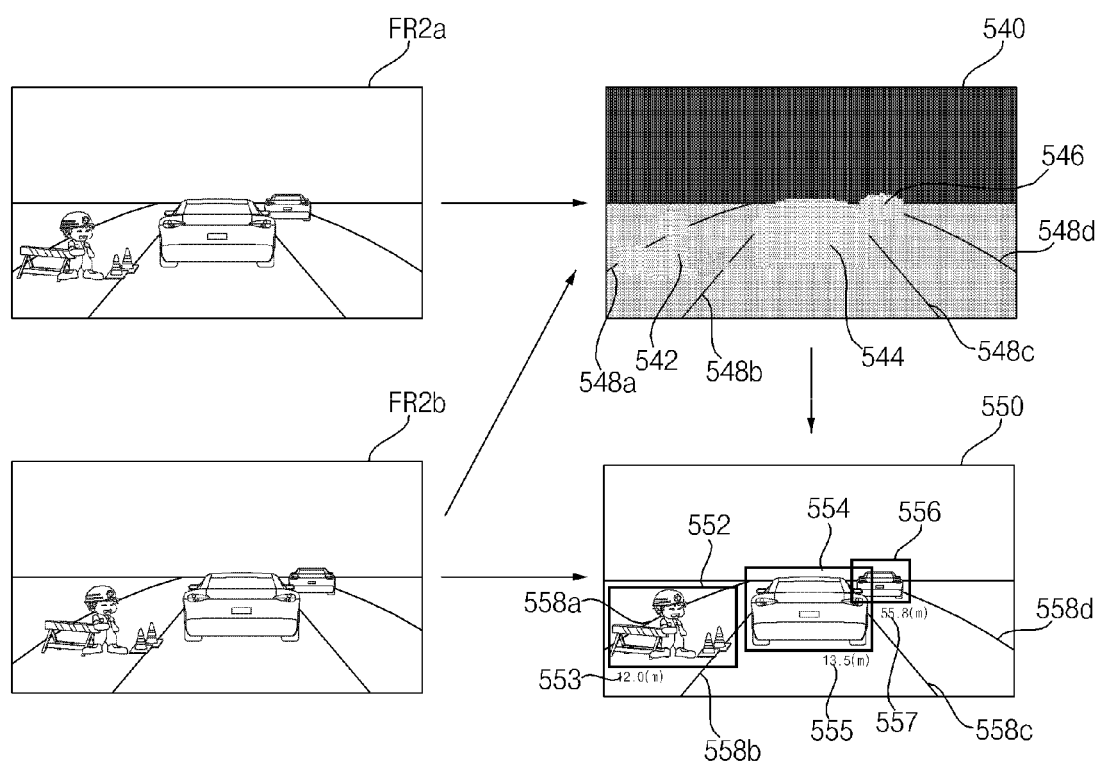

FIG. 5 is a diagram referenced to describe a method of operating the processor 170 or 270 of FIGS. 4a to 4b based on images respectively acquired in first and second frame periods.

Referring to FIG. 5, the plurality of cameras 295a, . . . , 295d sequentially acquires images FR1a and FR1b during the first and second frame periods.

The disparity calculator 420 of the processor 170 or 270 receives the images FR1a and FR1b processed by the image preprocessor 410, performs stereo matching with respect to the images FR1a and FR1b, and acquires a disparity map 520.

The disparity map 520 expresses the binocular parallax level between the stereo images FR1a and FR1b. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lines 528a, 528b, 528c and 528d, for example, disparity levels respectively corresponding to a construction area 522, a first foregoing vehicle 524 and a second foregoing vehicle 526.

The segmentation unit 432, the object detector 434 and the object verification unit 436 may perform segmentation, object detection and object verification with respect to at least one of the images FR1a and FR1b based on the disparity map 520.

In the figure, object detection and verification are performed with respect to the second image FR1b using the disparity map 520.

That is, the first to fourth lines 538a, 538b, 538c and 538d, the construction area 532, the first foregoing vehicle 534 and the second foregoing vehicle 536 are detected and verified from the image 530 as objects.

The object tracking unit 440 may track the verified objects by continuously acquiring the images.

Figure 6A:
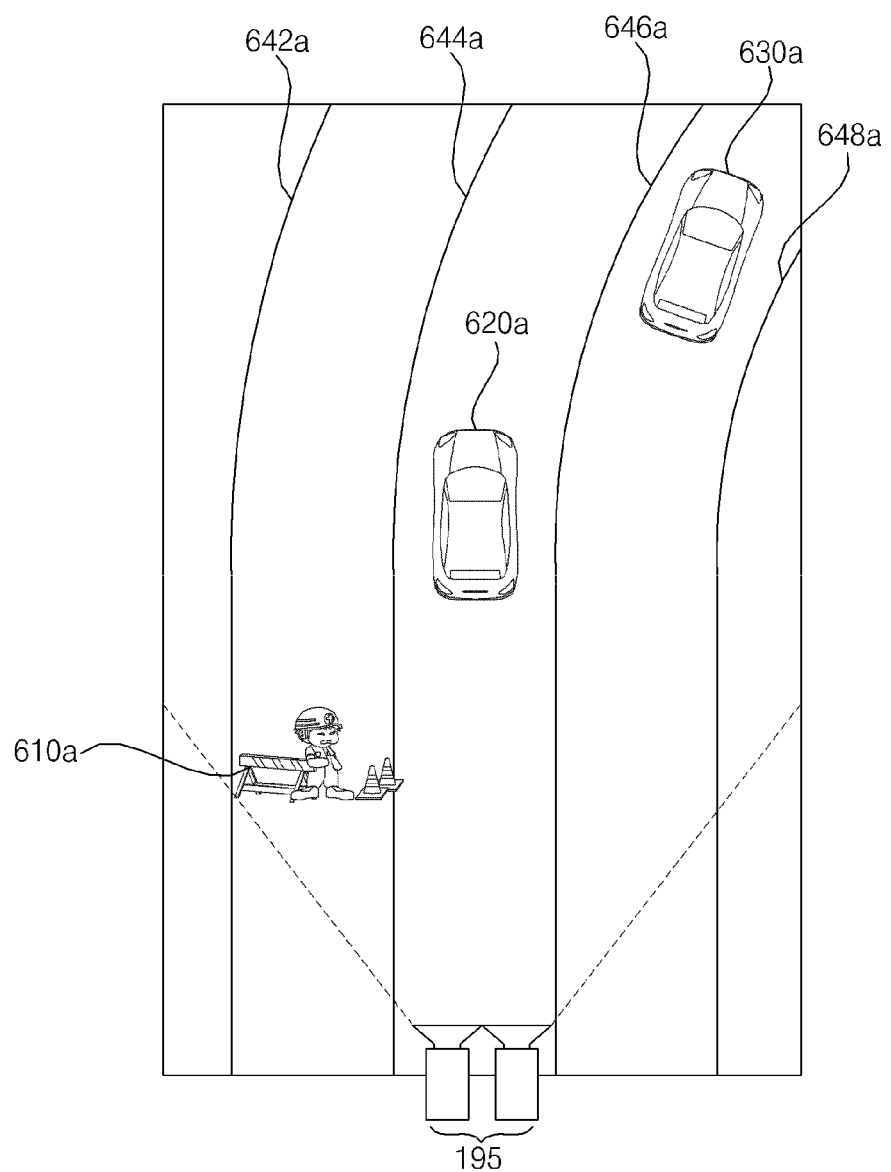
FIGS. 6a to 6b are views referenced to describe operation of the autonomous driving apparatus of FIG. 1.
Figure 6B:
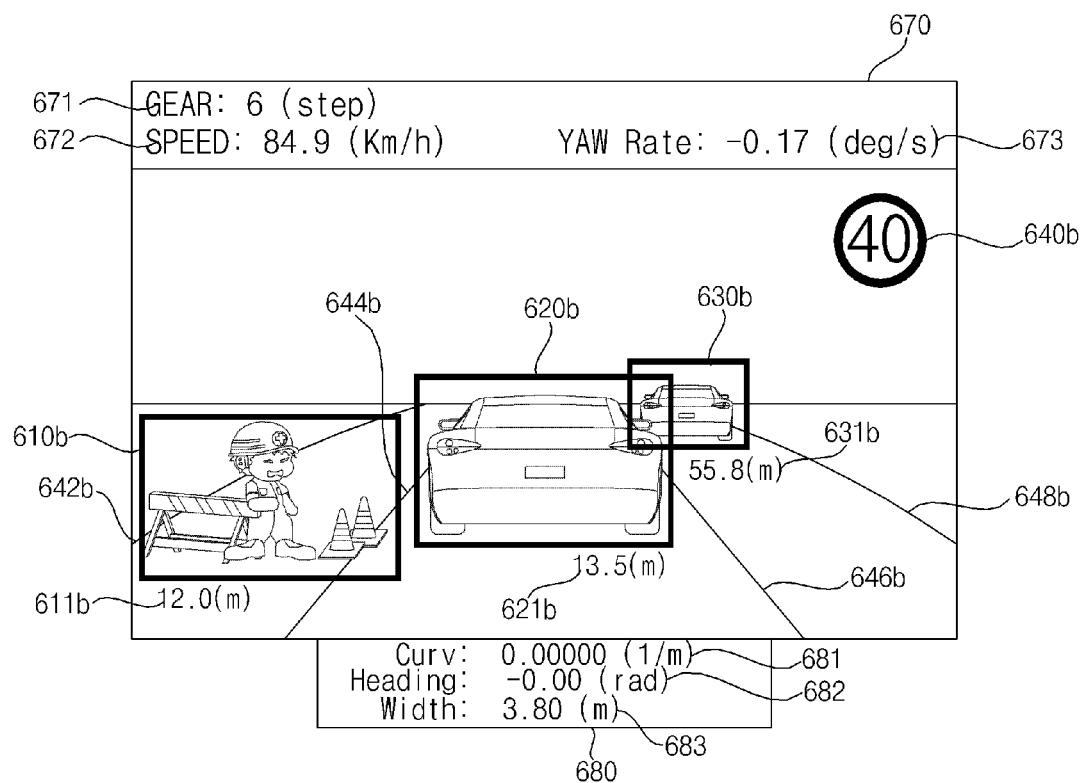

FIGS. 6a to 6b are views referenced to describe operation of the autonomous driving apparatus of FIG. 1.

First, FIG. 6a shows the situation of the front side of a vehicle captured by the stereo camera 195 provided inside the vehicle. In particular, the situation of the front side of the vehicle is displayed in a bird's eye view.

Referring to the figure, it can be seen that a first line 642a, a second line 644a, a third line 646a and a fourth line 648a are located from left to right, a construction zone 610a is located between the first line 642a and the second line 644a, a first foregoing vehicle 620a is located between the second line 644a and the third line 646a, and a second foregoing vehicle 630a is located between the third line 646a and the fourth line 648a.

Next, FIG. 6b is a diagram showing the case where the situation of the front side of the vehicle checked by the ADAS is displayed along with a variety of information. In particular, the image shown in FIG. 6b may be displayed on the display 180 provided by the ADAS or the vehicle display apparatus 400.

FIG. 6b shows the case where information is displayed based on the image captured by the stereo camera 195, unlike FIG. 6a.

Referring to the figure, it can be seen that a first line 642b, a second line 644b, a third line 646b and a fourth line 648b are located from left to right, a construction zone 610b is located between the first line 642b and the second line 644b, a first foregoing vehicle 620b is located between the second line 644b and the third line 646b, and a second foregoing vehicle 630b is located between the third line 646b and the fourth line 648b.

The ADAS 100a performs signal processing based on the stereo image captured by the stereo camera 195 and verify the objects such as the construction zone 610b, the first foregoing vehicle 620b and the second foregoing vehicle 630b. In addition, the first line 642b, the second line 644b, the third line 646b and the fourth line 648b may be verified.

Meanwhile, in the figure, in order to verify the objects such as the construction zone 610b, the first foregoing vehicle 620b and the second foregoing vehicle 630b, the construction zone 610b, the first foregoing vehicle 620b and the second foregoing vehicle 630b are framed.

The ADAS 100a may calculate distance information of the construction zone 610b, the first foregoing vehicle 620b and the second foregoing vehicle 630b based on the stereo image captured by the stereo camera 195.

In the figure, first distance information 611b, second distance information 621b and third distance information 631b respectively corresponding to the construction zone 610b, the first foregoing vehicle 620b and the second foregoing vehicle 630b are shown.

The ADAS 100a may receive sensor information of the vehicle from the ECU 770 or the sensor unit 760. In particular, vehicle speed information, gear information, yaw rate information indicating the rate of the rotation angle (yaw angle) of the vehicle, and vehicle angle information may be received and displayed.

Although, in the figure, the vehicle speed information 672, the gear information 671 and the yaw rate information 673 are displayed at the upper side 670 of the front image of the vehicle and the vehicle angle information 682 is displayed at the lower side 680 of the front image of the vehicle, various examples are possible. In addition, vehicle width information 683, road curvature information 681, and vehicle angle information 682 may also be displayed.

The ADAS 100a may receive speed limit information of the road on which the vehicle travels, through the communication unit 120 or the interface 130. In the figure, the speed limit information 640b is shown.

The ADAS 100a may display a variety of information shown in FIG. 6b on the display 180 or may store a variety of information without display. Such information may be used for various applications.

Figure 7:
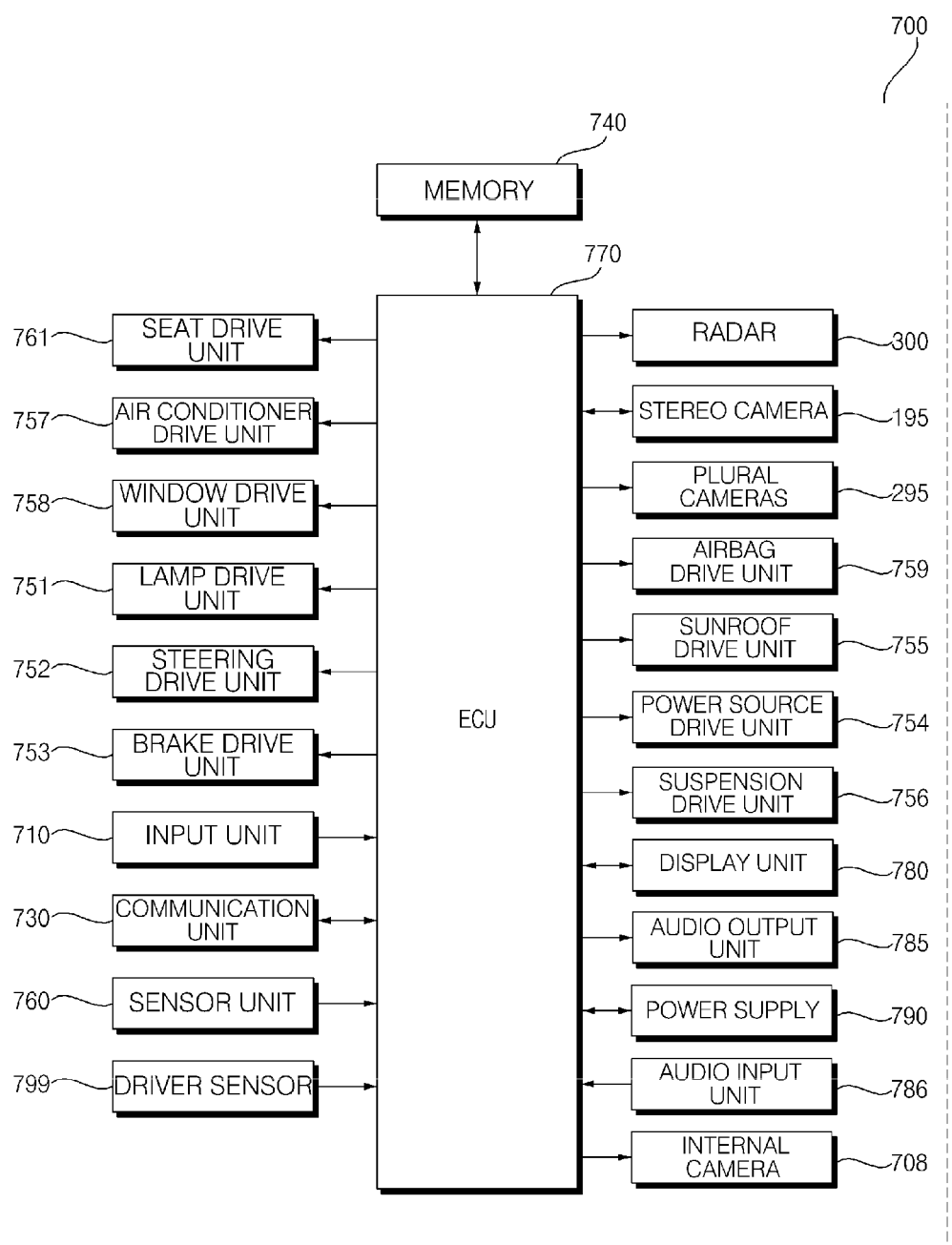
FIG. 7 is a block diagram showing an example of the internal configuration of a vehicle according to an embodiment of the present invention.

FIG. 7 is a block diagram showing an example of the internal configuration of a vehicle according to an embodiment of the present invention.

Referring to the figure, the vehicle 200 may include an electronic control apparatus 700 for vehicle control.

The electronic control apparatus 700 may include an input unit 710, a communication unit 720, a memory 740, a lamp drive unit 751, a steering drive unit 752, a brake drive unit 753, a power source drive unit 754, a sunroof drive unit, a suspension drive unit 756, an air conditioner drive unit 757, a window drive unit 758, an airbag drive unit 759, a sensor unit 760, an ECU 770, a display 780, an audio output unit 785, an audio input unit 786, a power supply 790, a stereo camera 195, a plurality of cameras 295, a radar 300, an internal camera 708, a seat drive unit 761, and a driver sensor 799.

The ECU 770 may include the processor 270 described with reference to FIG. 3c or 3d. Alternatively, in addition to the ECU 770, a processor for processing the images from the cameras may be further included.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as Bluetooth, Wi-Fi Direct, Wi-Fi, APiX, etc.

For example, the communication unit 720 may receive a schedule of a driver, schedule information related to a movement position, weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The memory 740 may store map information related to vehicle driving.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform electronic control of an airbag apparatus inside the vehicle 200. For example, the airbag drive unit may control an airbag to be deployed in a dangerous situation.

The seat drive unit 761 may control the position of the seat or seatback of the vehicle 200. For example, when a driver sits in a driver's seat, the position of the driver's seat or seatback may be controlled back and forth to suit the driver.

The seat drive unit 761 may drive rollers provided in the seat or seatback to provide pressure of a massager to the driver.

The sensing unit 760 is configured to sense signals associated with traveling of the vehicle 100. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the around view monitoring apparatus 100b, receive map information from the memory 740 and control operations of the drive units 751, 752, 753, 754 and 756.

In addition, the ECU 770 may receive weather information and road traffic situation information, e.g., Transport Protocol Experts Group (TPEG) information, from the communication unit 720.

The ECU 770 may synthesize a plurality of images received from the plurality of cameras 295 to generate an around view image. In particular, when the speed of the vehicle is equal to or less than a predetermined speed or when the vehicle is reversed, the around view image may be generated.

The display 780 may display the image of the front side of the vehicle while the vehicle travels or the around view image when the vehicle is slowly driven. In particular, various user interfaces may be provided in addition to the around view image.

For display of the around view image, the display 780 may include a cluster or a head up display (HUD) located at the internal front side of the vehicle. When the display 780 is a HUD, a projection module for projecting an image onto the windshield of the vehicle 200 may be included. The display 780 may include a touchscreen capable of performing an input function.

The audio output unit 785 outputs sound corresponding to the input unit 710, that is, the button.

The audio input unit 786 may receive user voice. The audio input unit may include a microphone. The received voice may be converted into an electrical signal and delivered to the ECU 770.

The power supply 790 may supply power required to operate the respective components under control of the ECU 770, In particular, the power supply 790 may receive power from, for example, a battery (not illustrated) inside the vehicle.

The stereo camera 195 is used for operation of the ADAS. This has been described above and thus a description thereof will be omitted.

The plurality of cameras 295 is used to provide the around view image and may include four cameras as shown in FIG. 2c. For example, the plurality of around view cameras 295a, 295b, 295c and 295d may be disposed at the left, rear, right and front sides of the vehicle. The plurality of images captured by the plurality of cameras 295 may be delivered to the ECU 770 or the processor (not shown).

The internal camera 708 captures an image of the interior of the vehicle including the driver. For example, the internal camera may include an RGB camera, an IR camera for heat detection, etc.

The driver sensor 799 senses the body information of the driver. For example, the driver sensor may sense the blood pressure, sleep, etc. of the driver.

The radar 300 transmits a transmission signal and receives a reception signal reflected from an object near the vehicle. Distance information may be output based on a difference between the transmission signal and the reception signal. In addition, phase information may also be output.

Figure 8:
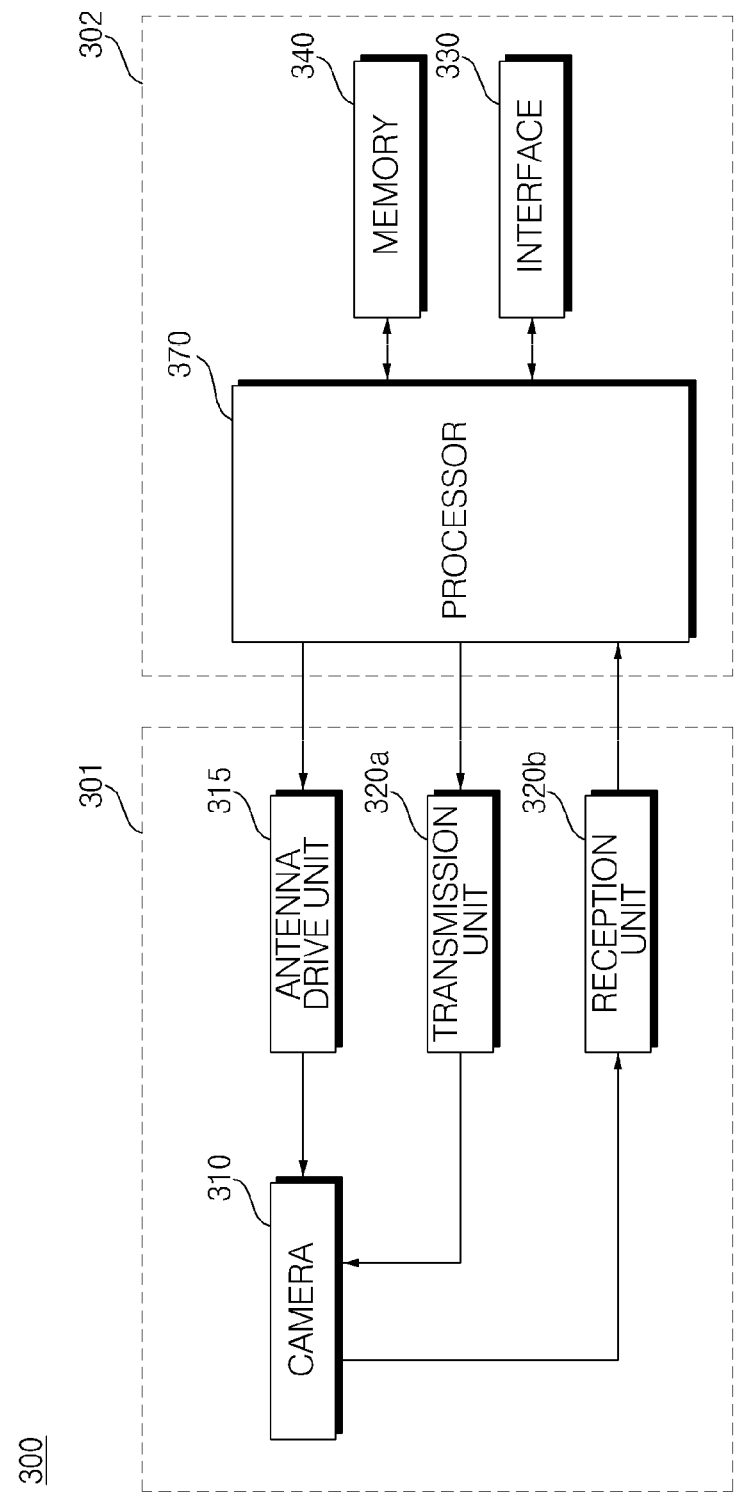
FIG. 8 is a block diagram showing the internal configuration of a radar according to an embodiment of the present invention.

FIG. 8 is a block diagram showing the internal configuration of a radar according to an embodiment of the present invention.

Referring to the figure, the radar 300 according to the embodiment of the present invention may include an antenna 310, an antenna drive unit 315 for driving the antenna 310, a transmission unit 320a for transmitting a transmission signal to the antenna 310, a reception unit 320b for performing signal processing with respect to a reception signal received by the antenna 310, and a processor 370 for calculating distance information or phase information of an object located near a vehicle based on the transmission signal and the reception signal.

The radar 300 may further include a memory 340 and an interface 330 for exchanging data with another apparatus or unit located in the vehicle.

In the antenna 310, magnetic dipoles of xz, yz and xy planes may be formed and polarized waves may be independently output, such that waves are stably transmitted and received in all directions.

The radar 300 according to the embodiment of the present invention may output radar signals or radar beams to the outside and receive radar signals or radar beams reflected from an object located near the vehicle.

To this end, the processor 370 may control the antenna drive unit 315 such that electrical signals are applied to the antenna 310.

More specifically, the processor 370 may apply electrical signals to first to third feeders 932, 934 and 936 to perform control to form magnetic dipoles on three orthogonal axes.

The processor 370 may time-divisionally apply electrical signals to first to third feeders 932, 934 and 936 to perform control to time-divisionally form magnetic dipoles on three orthogonal axes.

Alternatively, the processor 370 may simultaneously apply electrical signals to first to third feeders 932, 934 and 936 to perform control to simultaneously form magnetic dipoles on three orthogonal axes.

The processor 370 may perform signal processing with respect to a baseband region and calculate the distance information or phase information of the object located near the vehicle in consideration of a difference in level, phase or time between the transmission signal of the transmission unit 320a and the reception signal of the reception unit 320b.

In addition, the processor 370 may calculate a degree of vehicle collision risk based on the distance information or phase information of the object located near the vehicle and generate a control signal for controlling at least one of the steering drive unit 752, the brake drive unit 753, the suspension drive unit 756 and the power supply drive unit 754 based on the calculated degree of vehicle collision risk.

The transmission unit 320a may convert a baseband signal into an RF signal which is a transmission signal.

The reception unit 320b may convert a reception signal, which is an RF signal, into a baseband signal.

The structure of the antenna 310 will be described in greater detail with reference to FIG. 9 and subsequent figures thereto.

Figure 9:
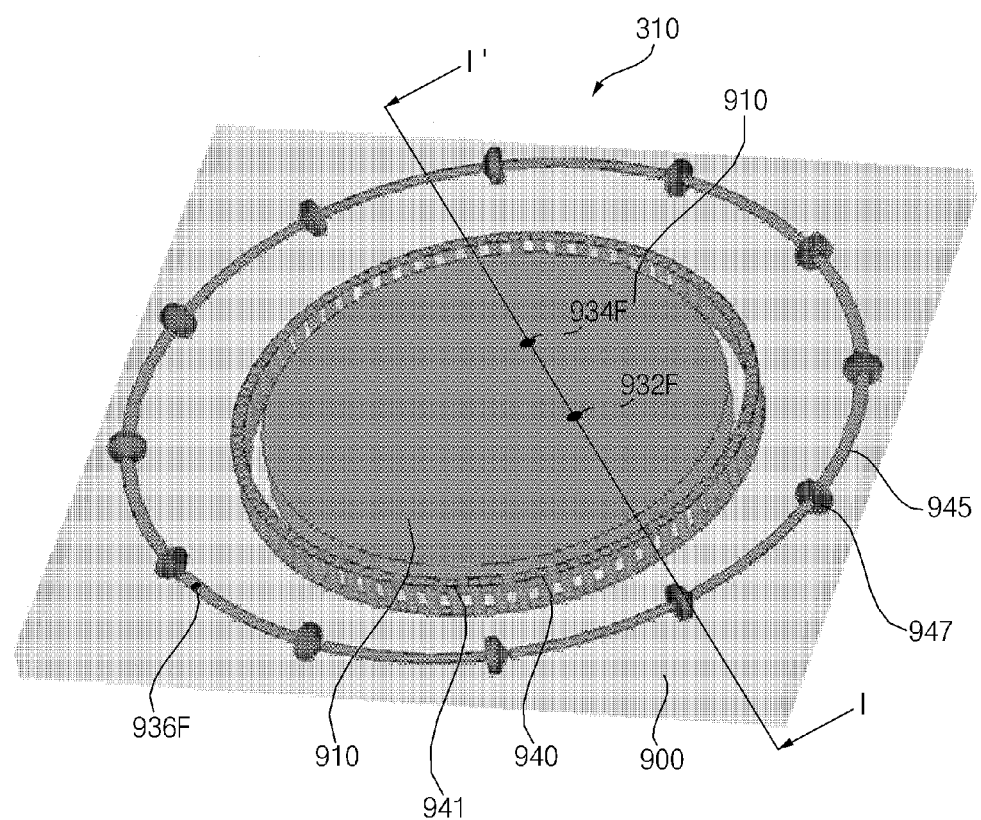
FIG. 9 is a view showing the antenna of FIG. 8.
Figure 10:
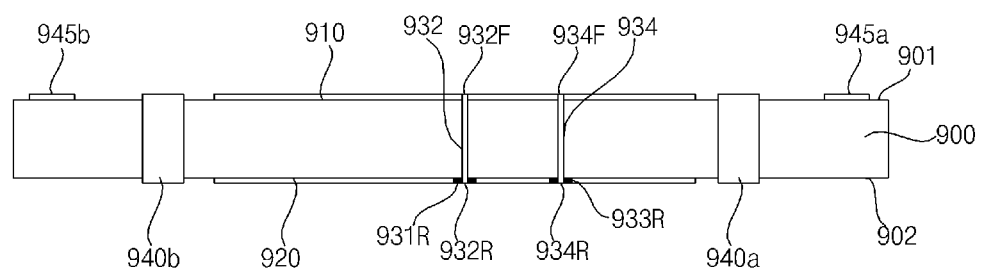
FIG. 10 is a side view of the antenna taken along line I-I' of FIG. 9.

FIG. 9 is a view showing the antenna of FIG. 8, and FIG. 10 is a side view of the antenna taken along line I-I' of FIG. 9.

Referring to the figure, the antenna 310 according to the embodiment of the present invention may include, a first conductive patch (upper patch) 910 disposed on a first surface of a substrate 900, a second conductive patch (lower patch) 920 disposed on a second surface of the substrate 900, first and second feeders 932 and 934 electrically connected to the first conductive patch 910, a plurality of vias 940 surrounding the peripheries of the first conductive patch 910 and the second conductive patch 920, a loop member 945 disposed on the first surface of the substrate 900 and surrounding the vias 940, and a third feeder 936 electrically connected to the loop member 945. The area of the first conductive patch 910 may be equal to that of the second conductive patch 920.

The first conductive patch (upper patch) 910 and the second conductive patch (lower patch) 920 may have the same area and have a circular shape.

The first feeder 932 and the second feeder 934 isolated from the second conductive patch 920 may be connected to the first conductive patch 910 through a first hole 932 and a second hole 934.

The second conductive path 920 may be electrically connected to the ground.

A first end 932F of the first feeder 932 is electrically connected to the conductive patch (upper patch) 910 and a second end 932R of the first feeder 932 is electrically isolated from the second conductive patch 920.

A first end 934F of the second feeder 934 is electrically connected to the conductive patch (upper patch) 910 and a second end 934R of the second feeder 934 is electrically isolated from the second conductive patch 920.

Conductive members may be connected to the second end 932R of the first feeder. 932 and the second end 934R of the second feeder 934 such that a first electrical signal and a second electrical signal are applied thereto.

The third feeder 936 may be formed in the loop member 945 formed on the first surface of the substrate 900.

The first feeder 932 and the second feeder 934 may be formed on an x axis and a y axis of a plane.

The first feeder 932 located on the x axis and the second feeder 934 located on the y axis generate currents that are orthogonal to each other, thereby generating polarized waves.

When electrical signals are applied to the first to third feeders 932, 934 and 936, the first feeder 932 may operate as a loop antenna located on an xz plane, the second feeder 934 may operate as a loop antenna located on a yz plane, and the third feeder 936 may operate as a loop antenna located on an xy plane.

That is, when electrical signals are applied to the first to third feeders 932, 934 and 936, a magnetic dipole of a y-axis direction may be formed by the first feeder 932, a magnetic dipole of an x-axis direction may be formed by the second feeder 934, and a magnetic dipole of a z-axis direction may be formed by the third feeder 936.

That is, when electrical signals are applied to the first to third feeders 932, 934 and 936, magnetic dipoles of three orthogonal axes may be formed.

By setting the area of the first conductive patch 910 to be equal to that of the second conductive patch 920, radiation of horizontally polarized waves in a horizontal plane increases, and complementary radiation patterns appear through the first and second feeders 932 and 934 such that a constant radiation pattern appears in the horizontal plane.

The vias 940 may have an opening 941 and may be formed in a slot shape.

The vias 940 may be formed of a conductive member.

Meanwhile, the plurality of vias 940 surrounding the peripheries of the first and second conductive patches is disposed between the peripheries of the first and second conductive patches 910 and 920 and the loop member 945, such that the horizontally polarized waves and the vertically polarized waves are isolated from each other.

The loop member 945 may be formed of a single conductive member having a circular shape.

Alternatively, the loop member 945 may include a dielectric 947 formed between a plurality of conductive members having a circular shape, as shown in the figure. By such conductive members and the dielectric 947, a capacitor having capacitance may be formed.

By the capacitance of such a capacitor, a resonant frequency may be adjusted.

The dielectric 947 may be formed of MIM (Metal-Insulator-Metal).

Unlike the figure, the loop member 945 may include a gap between a plurality of conductive members having a circular shape. That is, the gap may be formed at the position of the dielectric 947 of the figure. By such conductive members and the gap, a capacitor having capacitance may be formed. The capacitance of the capacitor may be adjusted and the resonant frequency may be adjusted, according to the size of the gap.

Such a loop member 945 may operate as a zero-th order resonator (ZOR) and generate vertically polarized waves orthogonal to the horizontally polarized waves generated by the first and second conductive patches 910 and 920.

As a result, the magnetic dipoles of the xz, yz and xy planes are formed by the electrical signals applied to the first, second and third feeders 932, 934 and 936, thereby independently generating polarized waves. Therefore, it is possible to stably transmit and receive waves in all directions.

According to the antenna 310 of the embodiment of the present invention, it is possible to implement dedicated short-range communication (DSRC) multiple-input multiple-output (MIMO).

FIGS. 11a to 13c are views referenced to describe the antenna 310 of FIG. 9 or 10.

Figure 11A:
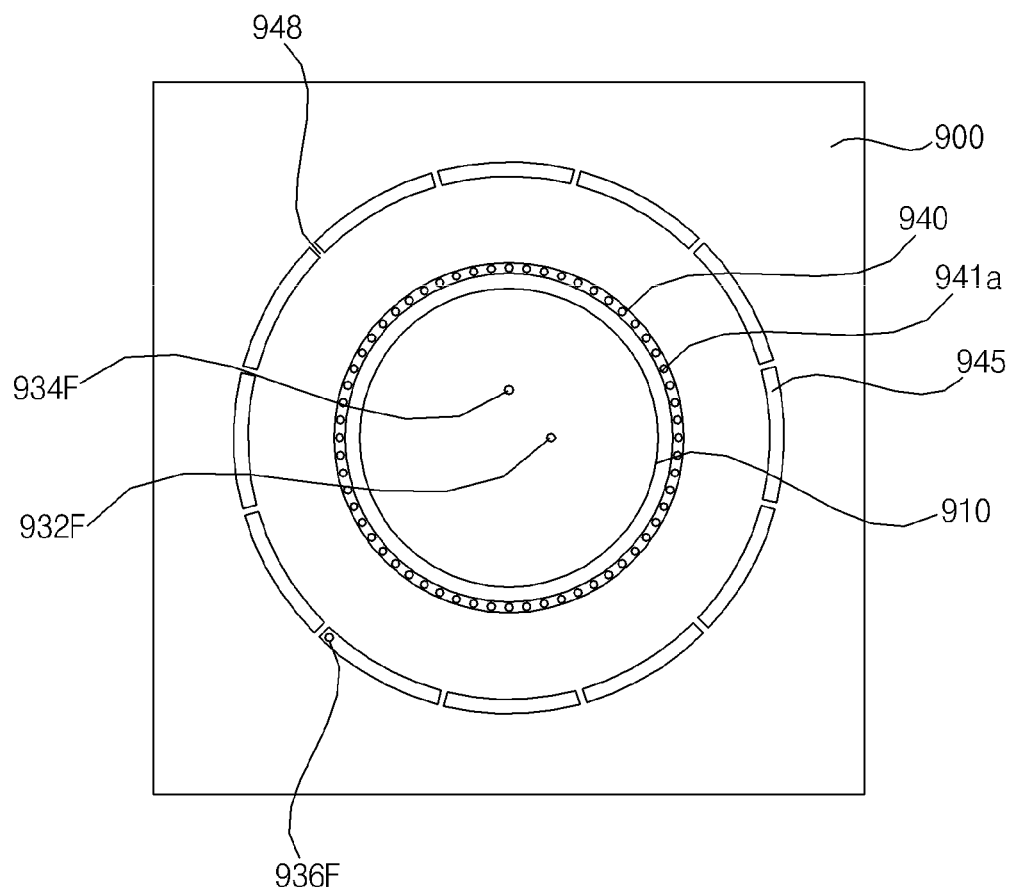
FIGS. 11a to 13c are views referenced to describe the antenna of FIG. 9 or 10.

First FIG. 11a shows the first surface, that is, the front surface of the antenna 310.

The antenna 310 of FIG. 11a includes the conductive patch (upper patch) 910 disposed on the first surface of the substrate 900, the first end 932F of the first feeder 932 electrically connected to the first conductive patch 910, the first end 934F of the second feeder 934, the plurality of vias 940 surrounding the first conductive patch 910, and the loop member 945 disposed on the first surface of the substrate 900 and surrounding the vias 940, similar to the antenna 310 of FIG. 9.

A gap 948 is formed in the loop member 945 to form a capacitor.

A first end 936F of the third feeder 936 electrically connected to the loop member 945 is formed.

Figure 11B:
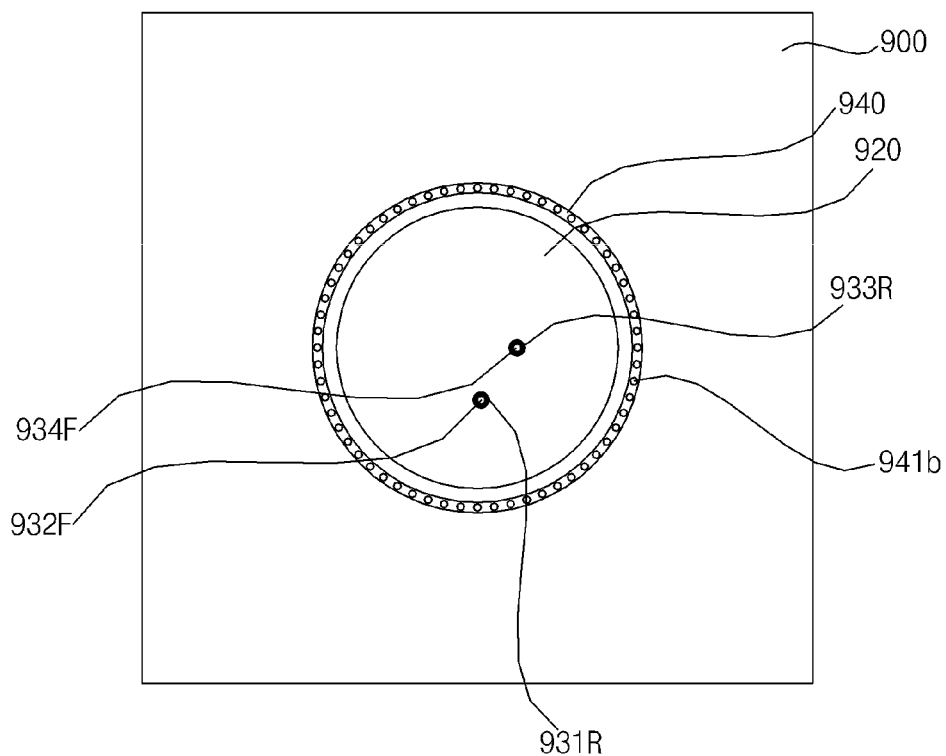

Next, FIG. 11b shows the second surface, that is, the rear surface, of the antenna 310.

Referring to the figure, the second conductive patch (lower patch) 920, the second end 932R of the first feeder 932 electrically connected to the second conductive patch 920, the second end 934R of the second feeder 934, and the plurality of vias 940 surrounding the second conductive patch 920 are formed on the second surface of the substrate 900. The loop member 945 is omitted.

Figure 12A:
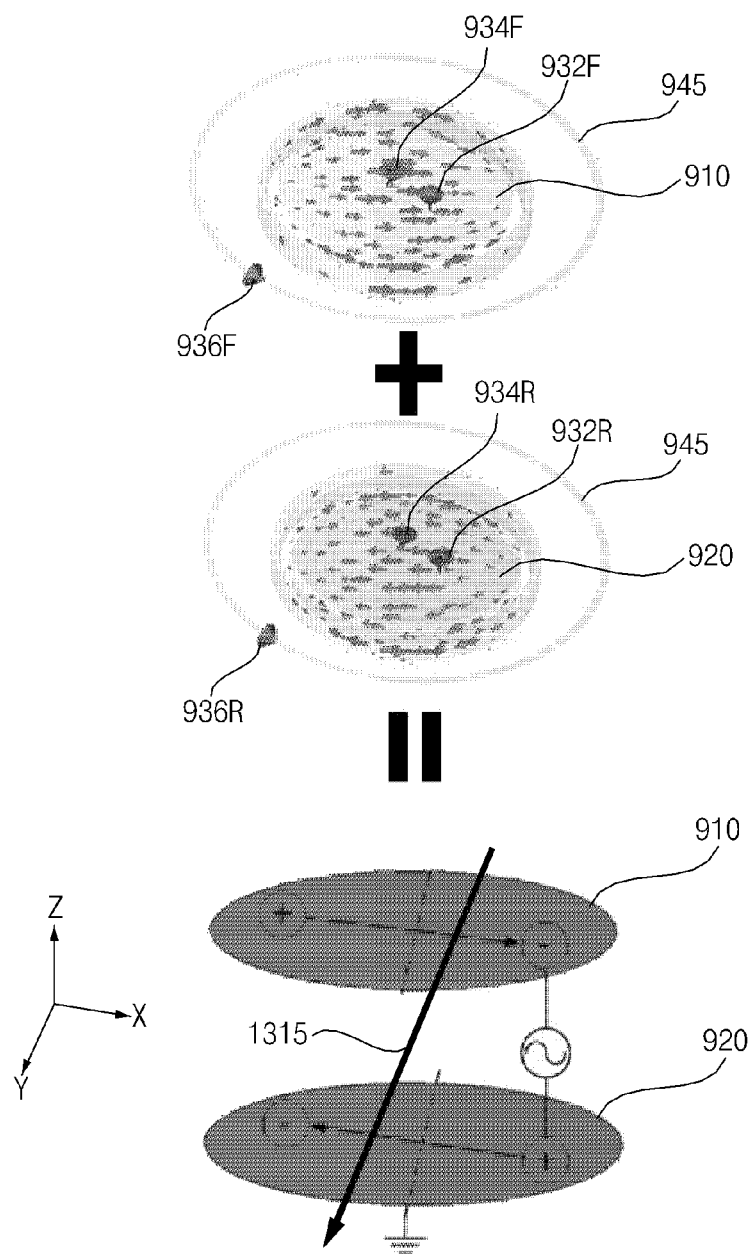

FIG. 12a shows the case where the electrical signal is applied to the first feeder 932.

Referring to the figure, by applying the electrical signal to the first feeder 932 formed in the x-axis direction, an electric field is formed on the first surface of the substrate 900 in the x-axis direction and an electric field is formed on the second surface of the substrate 900 in the −x-axis direction.

Thus, the first conductive patch 910 and the second conductive patch 920 operate as a loop antenna located on an xz plane and a magnetic dipole 1315 of a y-axis direction is formed.

Figure 12B:
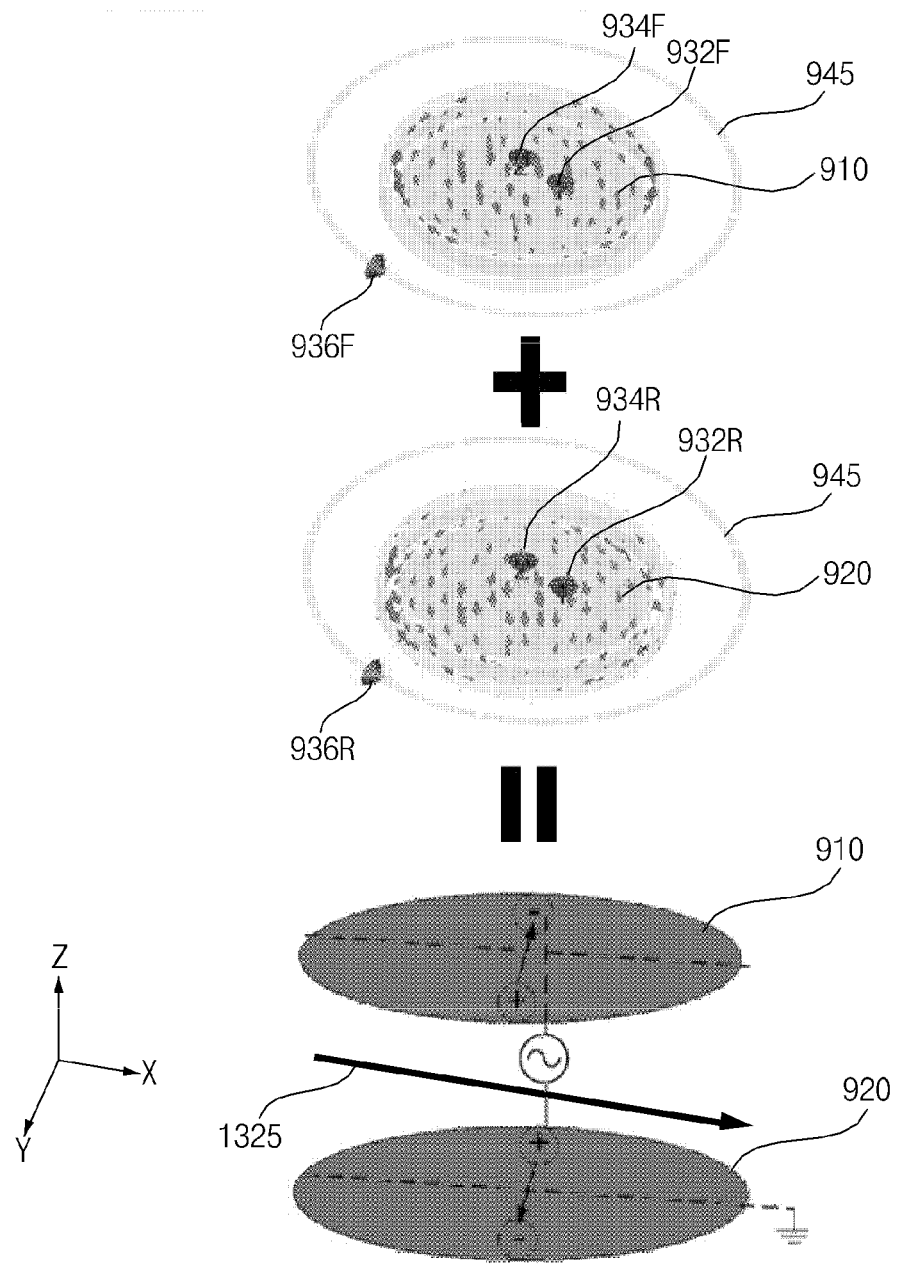

FIG. 12b shows the case where the electrical signal is applied to the second feeder 934.

Referring to the figure, by applying the electrical signal to the second feeder 932 formed in the y-axis direction, an electric field is formed on the first surface of the substrate 900 in the y-axis direction and an electric field is formed on the second surface of the substrate 900 in the −y-axis direction.

Thus, the first conductive patch 910 and the second conductive patch 920 operate as a loop antenna located on a yz plane and a magnetic dipole 1325 of an x-axis direction is formed.

Figure 12C:
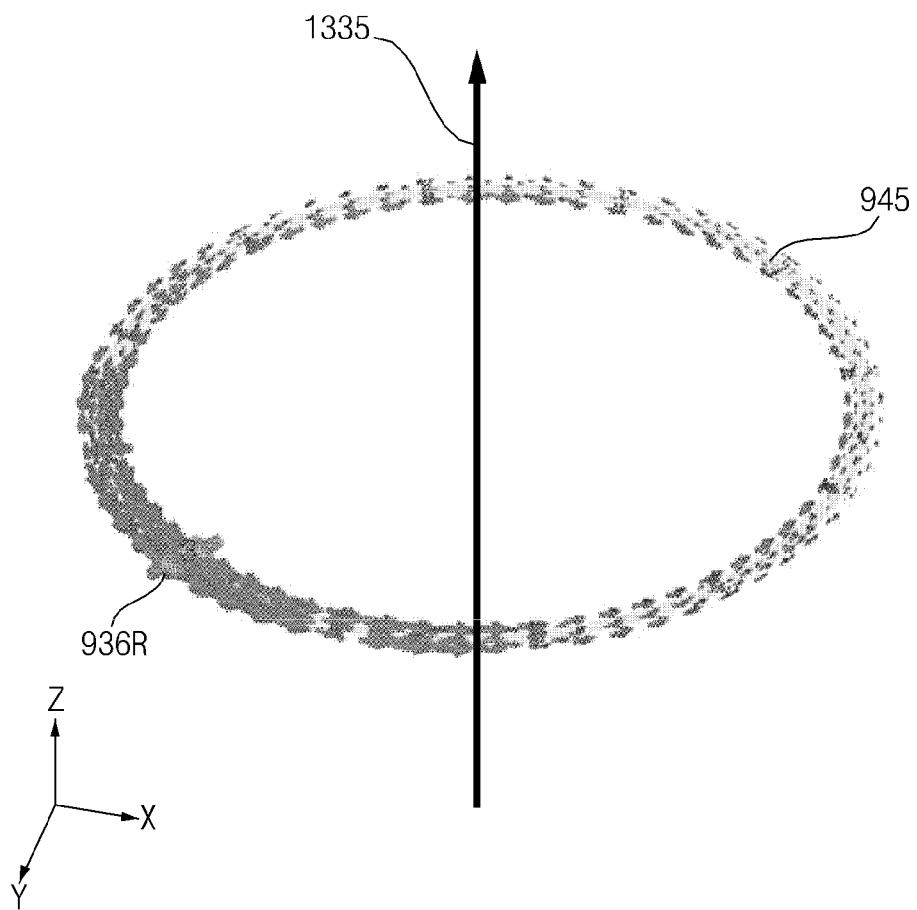

FIG. 12c shows the case where the electrical signal is applied to the third feeder 936.

Referring to the figure, by applying the electrical signal to the third feeder 936, an electric field is formed in the rotation direction of the loop member 945 formed on the first surface of the substrate 900.

Thus, the loop member 945 operates as a loop antenna located on an xy plane and a magnetic dipole 1335 of a z-axis direction is formed.

Such a loop member 945 operates as a zero-th order resonator (ZOR).

Figure 13A:
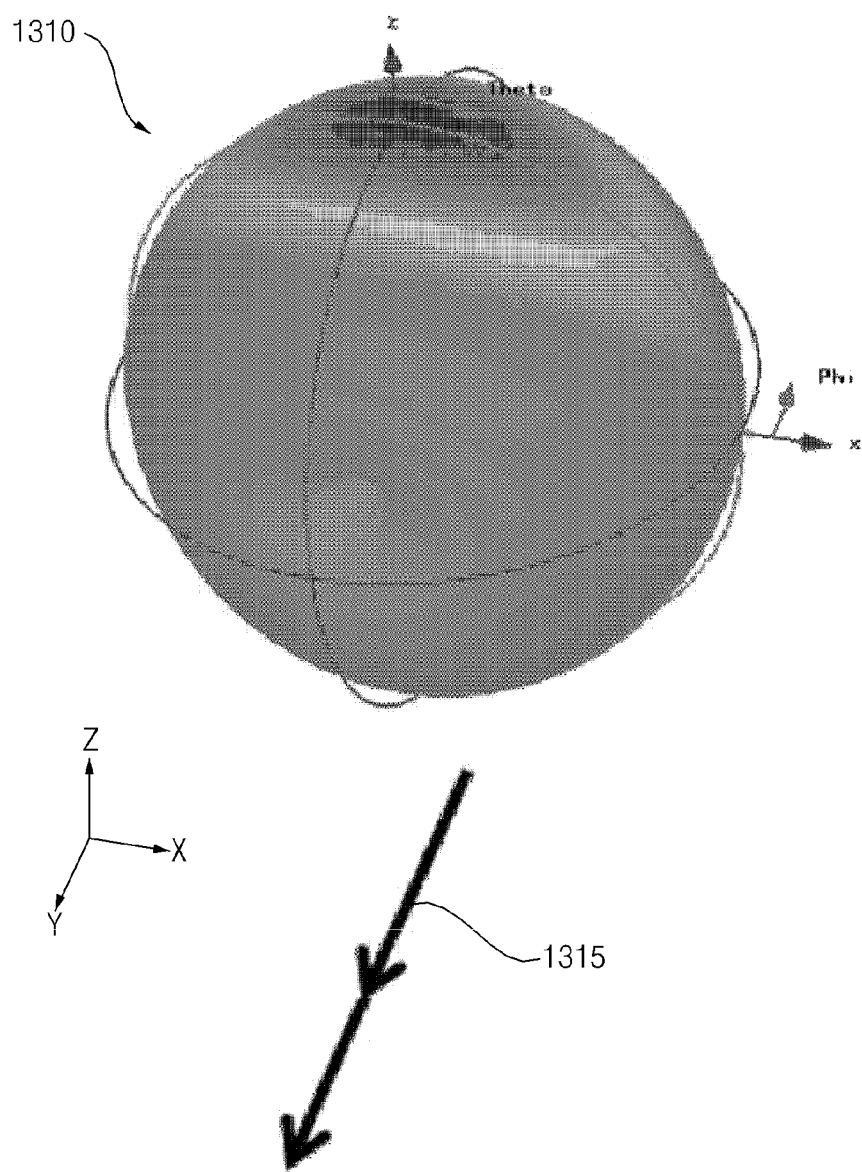
Figure 13B:
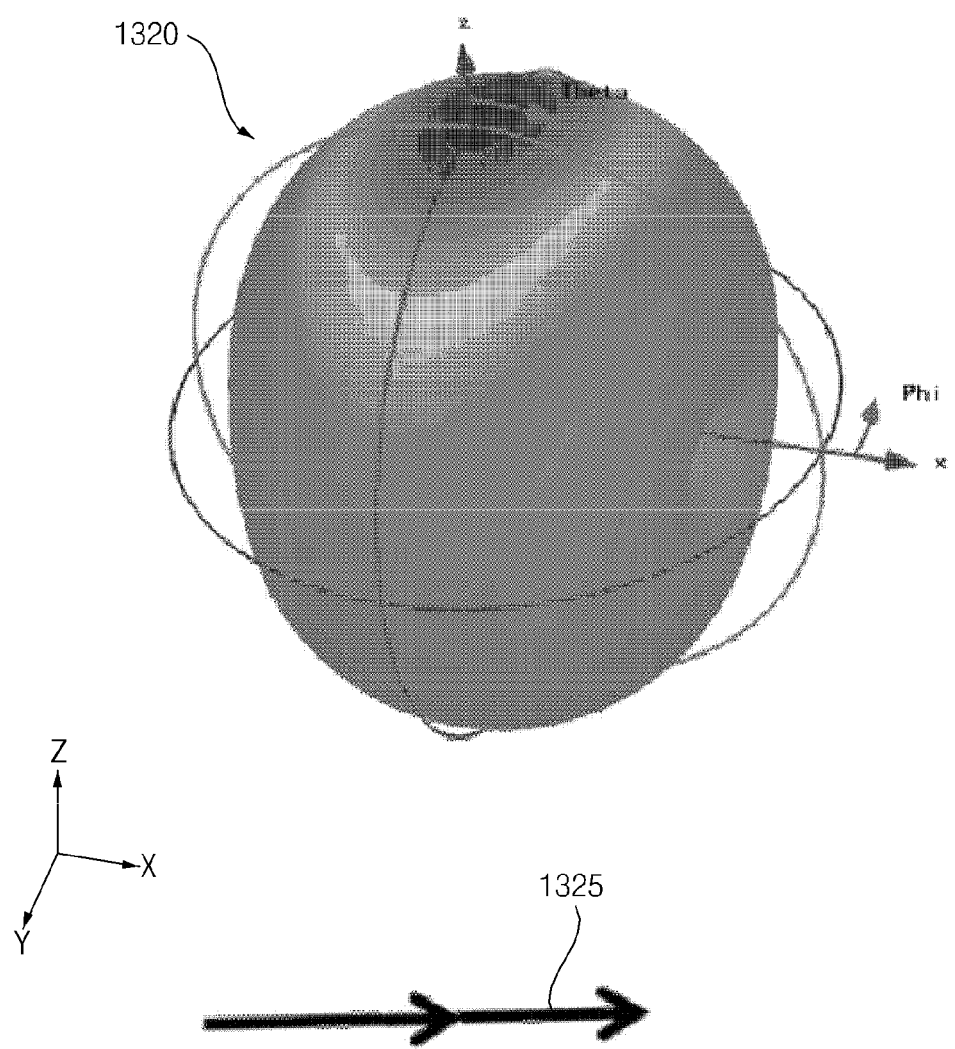
Figure 13C:
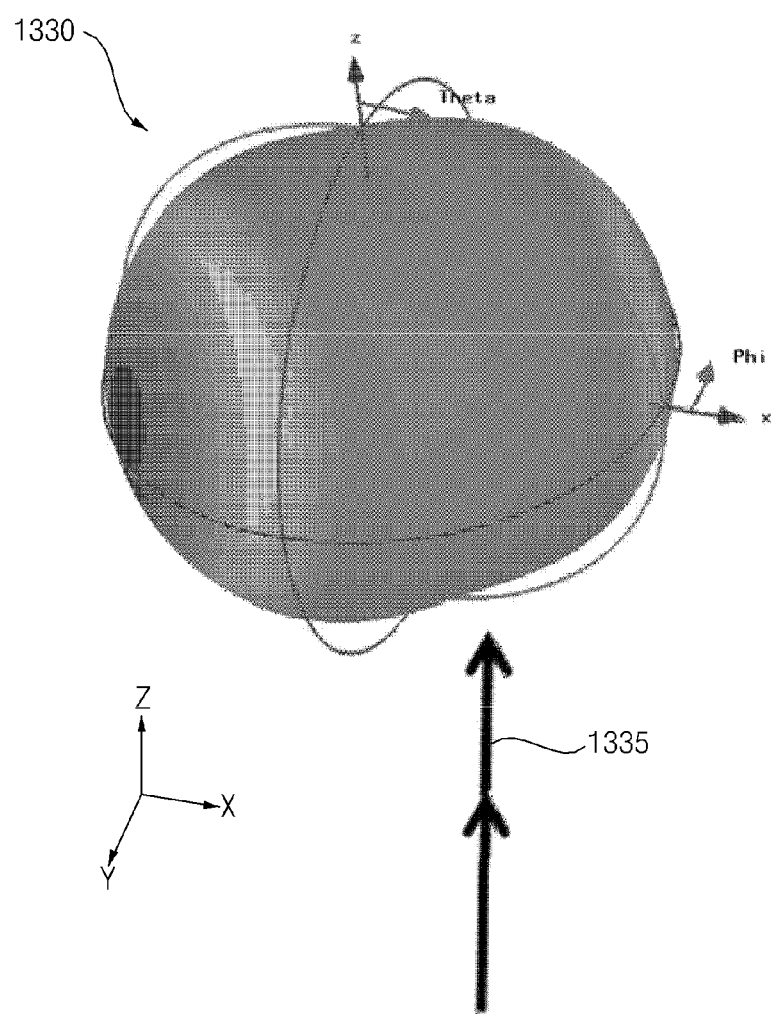

FIGS. 13a to 13c show radiation patterns according to operation of FIGS. 12a to 12c.

The radiation pattern 1310 of FIG. 13a is obtained when the first conductive patch 910 and the second conductive patch 920 operate as a loop antenna located on an xz plane and a magnetic dipole 1315 of a y-axis direction is formed.

The radiation pattern 1320 of FIG. 13b is obtained when the first conductive patch 910 and the second conductive patch 920 operate as a loop antenna located on a yz plane and a magnetic dipole 1325 of an x-axis direction is formed.

The radiation pattern 1330 of FIG. 13c is obtained when the loop member 945 operates as a loop antenna located on an xy plane and a magnetic dipole 1335 of a z-axis direction is formed.

By the electrical signals applied to the first, second and third feeders, the magnetic dipoles of the xz, yz and xy planes are formed, thereby independently generating polarized waves. Therefore, it is possible to stably transmit and receive waves in all directions.

The processor 370 of the radar 300 or the processor 770 of the vehicle 200 may apply the electrical signals to the first to third feeders 932, 934 and 936 to perform control to generate the magnetic dipoles of three orthogonal axes.

In particular, the processor 370 of the radar 300 or the processor 770 of the vehicle 200 may time-divisionally apply electrical signals to perform control to time-divisionally form magnetic dipoles of three orthogonal axes.

Alternatively, the processor 370 of the radar 300 or the processor 770 of the vehicle 200 may simultaneously apply electrical signals to the first to third feeders 932, 934 and 936 to perform control to simultaneously form magnetic dipoles of three orthogonal axes.

According to the antenna of the embodiment of the present invention, it is possible to implement dedicated short-range communication (DSRC) multiple-input multiple-output (MIMO).

In particular, the antenna of the embodiment of the present invention may be used for vehicle-to-vehicle communication such as V2X.

The above-described antenna may be provided in the radar of an autonomous vehicle.

That is, the vehicle according to the embodiment of the present invention may be an autonomous vehicle including a plurality of cameras 195 or 295, a radar 300 and a processor 770 for performing control to autonomously drive the vehicle 200 based on images from the plurality of cameras 300 and the distance information or phase information from the radar in an autonomous mode. At this time, the radar 300 comprises an antenna comprising a substrate, a first conductive patch disposed on a first surface of the substrate, a second conductive patch disposed on a second surface of the substrate, first and second feeders electrically connected to the first conductive patch, a plurality of vias surrounding peripheries of the first and second conductive patches, a loop member disposed on the first surface of the substrate and surrounding the vias, and a third feeder electrically connected to the loop member. In addition, an area of the first conductive patch may be equal to that of the second conductive patch.

Although the preferred embodiments of the present invention have been disclosed for illustrative purposes, the present invention is not limited to the above-described embodiments. Those skilled in the art will appreciate that various modifications are possible, without departing from the scope and spirit of the invention as disclosed in the accompanying claims. Such modifications should not be individually understood from the technical spirit or prospect of the present invention.

The invention claimed is:

1. An antenna comprising:
   a substrate;
   a first conductive patch disposed on a front surface of the substrate;
   a second conductive patch disposed on a rear surface of the substrate;
   first and second feeders electrically connected to the first conductive patch;
   a plurality of vias surrounding peripheries of the first and second conductive patches;
   a loop member disposed on the front surface of the substrate and surrounding the vias; and
   a third feeder electrically connected to the loop member,
   wherein the first conductive patch and the second conductive patch have a circular shape,
   wherein the first and second feeders penetrate between the front surface of the substrate and the rear surface of the substrate,
   wherein a first end of the first feeder is electrically connected to the first conductive patch and a second end of the first feeder is electrically isolated from the second conductive patch,
   wherein a first end of the second feeder is electrically connected to the first conductive patch and a second end of the second feeder is electrically isolated from the second conductive patch,
   wherein the second end of the first feeder and the second end of the second feeder are connected to first and second conductive members, respectively, and are configured to be applied with a first electrical signal and a second electrical signal, respectively, and
   wherein the second end of the first feeder, the second end of the second feeder, the second conductive patch and the plurality of vias surrounding the second conductive patch are formed on the rear surface of the substrate, and the loop member is absent from the rear surface of the substrate.

2. The antenna according to claim 1, wherein electrical signals are applied to the first to third feeders to form magnetic poles of three orthogonal axes.

3. The antenna according to claim 1, wherein the first and second feeders isolated from the second conductive patch are electrically connected to the first conductive patch through first and second holes.

4. The antenna according to claim 1, wherein the second conductive patch is electrically connected to the ground.

5. The antenna according to claim 1, wherein electrical signals are time-divisionally applied to the first to third feeders to time-divisionally form magnetic dipoles of three orthogonal axes.

6. The antenna according to claim 1, wherein electrical signals are simultaneously applied to the first to third feeders to simultaneously form magnetic dipoles of three orthogonal axes.

7. The antenna according to claim 1, wherein the vias are formed in a slot shape.

8. The antenna according to claim 1, wherein the loop member includes a plurality of conductive members having a circular shape,
wherein gaps between the plurality of conductive members are formed in the loop member to form a capacitor, and
wherein an area of the first conductive patch is equal to that of the second conductive patch.

9. A vehicle radar comprising:
an antenna;
an antenna drive unit for driving the antenna;
a transmission unit for transmitting a transmission signal to the antenna;
a reception unit for performing signal processing with respect to a reception signal received from the antenna; and
a processor for calculating distance information or phase information of an object located near a vehicle based on the transmission signal and the reception signal,
wherein the antenna comprises:
a substrate;
a first conductive patch disposed on a front surface of the substrate;
a second conductive patch disposed on a rear surface of the substrate;
first and second feeders electrically connected to the first conductive patch;
a plurality of vias surrounding peripheries of the first and second conductive patches;
a loop member disposed on the front surface of the substrate and surrounding the vias; and
a third feeder electrically connected to the loop member,
wherein the first conductive patch and the second conductive patch have a circular shape,
wherein the first and second feeders penetrate between the front surface of the substrate and the rear surface of the substrate,
wherein a first end of the first feeder is electrically connected to the first conductive patch and a second end of the first feeder is electrically isolated from the second conductive patch,
wherein a first end of the second feeder is electrically connected to the first conductive patch and a second end of the second feeder is electrically isolated from the second conductive patch,
wherein the second end of the first feeder and the second end of the second feeder are connected to first and second conductive members, respectively, and are configured to be applied with a first electrical signal and a second electrical signal, respectively, and
wherein the second end of the first feeder, the second end of the second feeder, the second conductive patch and the plurality of vias surrounding the second conductive patch are formed on the rear surface of the substrate, and the loop member is absent from the rear surface of the substrate.

10. The vehicle radar according to claim 9, wherein the processor performs control to apply electrical signals to the first to third feeders to form magnetic poles of three orthogonal axes.

11. The vehicle radar according to claim 9, wherein the processor performs control to time-divisionally apply electrical signals to the first to third feeders to time-divisionally form magnetic dipoles of three orthogonal axes.

12. The vehicle radar according to claim 9, wherein the processor performs control to simultaneously apply electrical signals to the first to third feeders to simultaneously form magnetic dipoles of three orthogonal axes.

13. The vehicle radar according to claim 9, wherein the loop member includes a plurality of conductive members having a circular shape,
wherein gaps between the plurality of conductive members are formed in the loop member to form a capacitor, and
wherein an area of the first conductive patch is equal to that of the second conductive patch.

14. A vehicle comprising:
a plurality of cameras;
a radar; and
a processor for performing control to autonomously drive the vehicle based on images from the plurality of cameras and distance information or phase information from the radar in an autonomous mode,
wherein the radar comprises an antenna comprising a substrate, a first conductive patch disposed on a front surface of the substrate, a second conductive patch disposed on a rear surface of the substrate, first and second feeders electrically connected to the first conductive patch, a plurality of vias surrounding peripheries of the first and second conductive patches, a loop member disposed on the front surface of the substrate and surrounding the vias, and a third feeder electrically connected to the loop member,
wherein the first conductive patch and the second conductive patch have a circular shape,
wherein the first and second feeders penetrate between the front surface of the substrate and the rear surface of the substrate,
wherein a first end of the first feeder is electrically connected to the first conductive patch and a second end of the first feeder is electrically isolated from the second conductive patch,
wherein a first end of the second feeder is electrically connected to the first conductive patch and a second end of the second feeder is electrically isolated from the second conductive patch,
wherein the second end of the first feeder and the second end of the second feeder are connected to first and second conductive members, respectively, and are configured to be applied with a first electrical signal and a second electrical signal, respectively, and
wherein the second end of the first feeder, the second end of the second feeder, the second conductive patch and the plurality of vias surrounding the second conductive patch are formed on the rear surface of the substrate, and the loop member is absent from the rear surface of the substrate.

15. The vehicle according to claim 14, wherein the processor performs control to apply electrical signals to the first to third feeders to form magnetic poles of three orthogonal axes.

16. The vehicle according to claim 14, wherein the processor performs control to time-divisionally apply electrical signals to the first to third feeders to time-divisionally form magnetic dipoles of three orthogonal axes.

17. The vehicle according to claim 14, wherein the processor performs control to simultaneously apply electrical signals to the first to third feeders to simultaneously form magnetic dipoles of three orthogonal axes.

18. The vehicle according to claim 14, wherein the loop member includes a plurality of conductive members having a circular shape, wherein gaps between the plurality of conductive members are formed in the loop member to form a capacitor, and wherein an area of the first conductive patch is equal to that of the second conductive patch.

* * * * *